(12) United States Patent
Shibuya et al.

(10) Patent No.: US 12,210,247 B2
(45) Date of Patent: Jan. 28, 2025

(54) LIQUID CRYSTAL ELEMENT AND EYEGLASSES

(71) Applicant: ELCYO CO., LTD., Kyoto (JP)

(72) Inventors: Giichi Shibuya, Kyoto (JP); Sunri Lee, Kyoto (JP); Masanori Ozaki, Osaka (JP)

(73) Assignee: Elcyo Co., Ltd., Kyoto (JP)

( * ) Notice: Subject to any disclaimer, the term of this patent is extended or adjusted under 35 U.S.C. 154(b) by 0 days.

(21) Appl. No.: 18/400,220

(22) Filed: Dec. 29, 2023

(65) Prior Publication Data

US 2024/0134234 A1 Apr. 25, 2024
US 2024/0231158 A9 Jul. 11, 2024

Related U.S. Application Data

(63) Continuation of application No. PCT/JP2022/025879, filed on Jun. 29, 2022.

(30) Foreign Application Priority Data

Jul. 2, 2021 (JP) ................................ 2021-111139

(51) Int. Cl.
*G02F 1/1343* (2006.01)
*G02B 3/14* (2006.01)
(Continued)

(52) U.S. Cl.
CPC ......... *G02F 1/134309* (2013.01); *G02B 3/14* (2013.01); *G02B 27/0172* (2013.01);
(Continued)

(58) Field of Classification Search
None
See application file for complete search history.

(56) References Cited

U.S. PATENT DOCUMENTS 6,284,208 B1 9/2001 Thomassen
2001/0040743 A1* 11/2001 Graves ...................... G02F 1/29
359/849

(Continued)

FOREIGN PATENT DOCUMENTS

| JP | 2009-204938 A | | 9/2009 |
| JP | 2018101026 A | * | 6/2018 |
| WO | WO2016117604 A1 | | 7/2016 |

*Primary Examiner* — Ryan Crockett
(74) *Attorney, Agent, or Firm* — Kolitch Romano Dascenzo Gates LLC

(57) ABSTRACT

This liquid crystal element comprises a liquid crystal layer LC and a plurality of unit-electrodes U1 and U2, each including a first electrode E1 that is linearly formed, a second electrode E2 that is linearly formed and receives a voltage different from that of the first electrode E1, and a resistive layer HR having higher electric resistivity than the first electrode E1 and the second electrode E2, characterized in that the resistive layer HR in each of the plurality of unit-electrodes U1 and U2 is separated from the resistive layer HR in the adjacent unit-electrodes U1 and U2 and is disposed in a region AR between the first electrode E1 and the second electrode E2 in a plan view, and at least some unit-electrodes U2 from among the plurality of unit-electrodes U1 and U2 have an auxiliary electrode EC in the region AR, the auxiliary electrode EC being linearly formed with a line width equal to or smaller than the line width of at least one of the first electrode E1 and the second electrode E2.

19 Claims, 25 Drawing Sheets

(51) Int. Cl.
*G02B 27/01* (2006.01)
*G02C 7/08* (2006.01)
(52) U.S. Cl.
CPC ............. *G02C 7/085* (2013.01); *G02C 7/088* (2013.01); *G02B 2027/0178* (2013.01)

(56) References Cited

U.S. PATENT DOCUMENTS

| | | | |
|---|---|---|---|
| 2004/0108984 A1* | 6/2004 | Ogasawara | G02F 1/29 |
| 2007/0183293 A1* | 8/2007 | Murata | G11B 7/13925 |
| | | | 369/112.02 |
| 2013/0250223 A1* | 9/2013 | Takagi | G02F 1/134309 |
| | | | 349/138 |
| 2013/0278847 A1 | 10/2013 | Hong et al. | |
| 2015/0029424 A1* | 1/2015 | Gordon | B29D 11/00038 |
| | | | 349/13 |
| 2016/0313565 A1 | 10/2016 | Wang et al. | |
| 2018/0031947 A1* | 2/2018 | Shibuya | G02F 1/13 |
| 2018/0246354 A1* | 8/2018 | Popovich | G02F 1/1334 |
| 2019/0187339 A1* | 6/2019 | Shibuya | G02F 1/29 |
| 2022/0252931 A1* | 8/2022 | Jamali | G02F 1/134309 |
| 2023/0176446 A1* | 6/2023 | Shibuya | G02F 1/294 |
| | | | 349/200 |

\* cited by examiner

LIQUID CRYSTAL ELEMENT AND EYEGLASSES

RELATED APPLICATIONS

This application claims priority under 35 U.S.C. § 120 to International Patent Application No. PCT/JP2022/025879, which was filed on Jun. 29, 2022, and which claims priority under U.S.C. § 119 to Japan Patent Application No. 2021-111139, which was filed on Jul. 2, 2021. The complete disclosures of the above-identified patent applications are hereby incorporated by reference.

TECHNICAL FIELD

The present invention relates to a liquid crystal element and eyeglasses.

BACKGROUND ART

A liquid crystal element is known that has a liquid crystal layer sandwiched between a pair of transparent substrates and can function as a Fresnel lens or a linear Fresnel lens by generating a saw-tooth-like refractive index distribution in the liquid crystal layer. Further, such an element has a variable focal length.

Furthermore, Patent Document 1 describes a liquid crystal element including a high-resistance layer, and Patent Document 2 describes a liquid crystal lens including a raised portion that functions as an electrical barrier, and thereby the liquid crystal lens can suppress the rise of liquid crystal molecules due to an electric field applied from adjacent electrodes.

CITATION LIST

Patent Literature

Patent Document 1; International Publication WO2016/117604
Patent Document 2; U.S. Pat. No. 6,284,208

SUMMARY OF THE INVENTION

Technical Problem

In a liquid crystal element that functions as a Fresnel lens or a linear Fresnel lens, multiple electrode structures are arranged to correspond to the saw-tooth undulations in the saw-tooth refractive index distribution, thereby generating a refractive index gradient in each electrode structure.

Such an electrode structure may have, for example, individually formed resistance layers to generate a refractive index gradient between two electrodes to which different voltages are applied. However, it may be difficult to obtain a desired refractive index gradient among the plurality of electrode structures provided in a liquid crystal element, and this may deteriorate the image quality of the liquid crystal.

The present invention takes the above-mentioned problems into consideration and has as an object to improve the image quality of a liquid crystal element in which a refractive index gradient is generated by a resistive layer and a saw-tooth-like refractive index distribution is generated in a liquid crystal layer.

Solution to Problem

The present invention can be understood from various aspects, and examples of these aspects are as follows.

(1) In consideration of the above-mentioned problems, the liquid crystal element according to the present invention has a liquid crystal layer and a plurality of unit-electrodes. The plurality of unit-electrodes includes a first electrode formed in a linear shape, a second electrode formed in a linear shape and which receives an input of a voltage different from that of the first electrode, and a resistance layer having a higher electrical resistivity than the first electrode and the second electrode. The resistance layer in each of the plurality of unit-electrodes is separated from the resistance layer in an adjacent unit-electrode and is arranged in a region between the first electrode and the second electrode in a plan view. At least a portion of the plurality of unit-electrodes is characterized in that it has an auxiliary electrode formed in a linear shape in the region with a line width equal to or less than the line width of at least one of the first electrode and the second electrode.

(2) The liquid crystal element described in (1), may be characterized in that the liquid crystal layer has a thickness of 5 μm or more and 30 μm or less.

(3) The liquid crystal element according to any one of (1) to (2), may be characterized in that the line width of the auxiliary electrode is ¾ or less of the line width of the first electrode and the second electrode.

(4) The liquid crystal element according to any one of (1) to (3), may be characterized in that at least some of the unit-electrodes have a distance between the first electrode and the second electrode of 200 μm or less.

(5) The liquid crystal element according to any one of (1) to (4), may be characterized in that the auxiliary electrode is arranged along one electrode of the first electrode and the second electrode so as to be close to the one electrode. The distance between the auxiliary electrode and the one side may be ½ or less of the distance between the auxiliary electrode and the other side.

(6) The liquid crystal element according to any one of (1) to (5), may be characterized in that the auxiliary electrode is arranged so that a distance P1 from the first electrode to the center of the auxiliary electrode is smaller than a distance P2 from the second electrode to the center of the auxiliary electrode. And when a voltage with an effective value V1E is applied to the first electrode, and a voltage with an effective value V2E higher than the effective value V1E is applied to the second electrode, a voltage with an effective value V3E that satisfies the following equation (1) may be applied to the auxiliary electrode.

$$V3_E > (V2_E - V1_E) \times \frac{P1}{P1+P2} + V1_E \qquad (1)$$

(7) The liquid crystal element according to any one of (1) to (6), may be characterized in that wherein the at least some of the unit-electrodes include at least two unit-electrodes in which widths of the region are different from each other and positions of the auxiliary electrode in the region are different from each other.

(8) The liquid crystal element according to any one of (1) to (7), may be characterized in that a voltage equal to or higher than a threshold voltage of a liquid crystal material sealed in the liquid crystal layer is applied to the auxiliary electrode.

(9) The liquid crystal element according to any one of (1) to (8), may be characterized in that a voltage is applied to the auxiliary electrode that is equal to or higher than the voltage at which retardation starts to change when a vertical electric field is applied to the liquid crystal material sealed in the liquid crystal layer.

(10) The liquid crystal element according to any one of (1) to (9), may be characterized in that the auxiliary electrode includes a first auxiliary electrode and a second auxiliary electrode, and the first auxiliary electrode is arranged along the first electrode so as to be closer to the first electrode than the second electrode, and the second auxiliary electrode is arranged along the second electrode so as to be closer to the second electrode than the first electrode.

(11) The liquid crystal element according to any one of (1) to (10), may be characterized in that the distance from the auxiliary electrode to the liquid crystal layer is less than or equal to the distance between at least one of the first electrode and the second electrode and the liquid crystal layer.

(12) The liquid crystal element according to any one of (1) to (11), may be characterized in that each of the plurality of unit-electrodes is configured to be able to generate a refractive index gradient in the liquid crystal layer in the region.

(13) The liquid crystal element according to any one of (1) to (12), may be characterized in that the plurality of unit-electrodes each has an arc shape or an annular shape and is arranged concentrically.

(14) The liquid crystal element according to any one of (1) to (13) may be characterized in that the plurality of unit-electrodes each has a rectangular shape and is arranged in series.

(15) The liquid crystal element according to any one of (1) to (14), may be characterized in that the liquid crystal element includes a transmitted light limiting portion that limits the transmitted light through a boundary between two unit-electrodes that are arranged adjacently in a direction away from the optical axis to be less than the transmitted light in the region.

(16) The liquid crystal element according to any one of (1) to (15), may be characterized in that an insulating wall-like structure is disposed at a boundary between two adjacent unit-electrodes.

(17) The liquid crystal element according to any one of (1) to (4), may be characterized in that at least some of the plurality of unit-electrodes include a unit-electrode having two of the auxiliary electrodes and a unit-electrode having one auxiliary electrode, and the width of the area in the unit-electrode having the one auxiliary electrode is narrower than the width of the area in the unit-electrode having the two auxiliary electrodes. Further, the liquid crystal element according to any one of (1) to (16), may be characterized in that the at least some of the unit-electrodes include at least two unit-electrodes that have different widths of the regions and the auxiliary electrodes in the regions have different widths, and one of the at least two unit-electrodes has a narrower region, the auxiliary electrode is formed to have a narrower width than the other and includes a colored metal film, and the other auxiliary electrode may be made of a transparent conductive film.

(18) Further, the liquid crystal element according to the present invention, has a plurality of unit-electrodes including a liquid crystal layer, a first electrode formed in a linear shape, and a second electrode formed in a linear shape and receiving an input of a voltage different from that of the first electrode, and a resistance layer having a higher electrical resistivity than a first electrode and a second electrode. The resistance layer of each of the plurality of unit-electrodes is separated from the resistance layer in an adjacent unit-electrode, and is arranged in a region between the first electrode and the second electrode in a plan view. The liquid crystal element according to the present invention is characterized in that it further includes a transmitted light limiting section that limits the transmitted light of the boundary portion between two adjacent unit-electrodes, so that the transmitted light is smaller than the transmitted light in the region.

(19) The liquid crystal element described in (18), may be characterized in that the liquid crystal the plurality of unit-electrodes are arranged in a row so that the width becomes narrower as the distance from the optical axis increases, and in each of the plurality of unit-electrodes, the first electrode is arranged on the side closer to the optical axis, the second electrode is arranged on the side farther from the optical axis, and moreover may be characterized in that the transmitted light restricting section is configured to include a shielding layer arranged to extend so as to overlap at least one of the first electrode in the unit-electrode disposed on the side closer to the optical axis of the two unit-electrodes, and a second electrode in the unit-electrode disposed on the side farther from the optical axis of the two unit-electrodes.

(20) The liquid crystal element described in (18), may be characterized in that the plurality of unit-electrodes are arranged in a row so that the width becomes narrower as the distance from the optical axis increases, and the transmitted light restricting section is configured to include a shielding layer disposed straddling the two unit-electrodes. The transmitted light restricting section may be characterized in that the ratio of the width of the shielding layer to the total width of the two unit-electrodes disposed straddling the shielding layer increases as the distance from the optical axis increases.

(21) Further, the liquid crystal element according to the present invention, may be characterized in that the liquid crystal element includes a liquid crystal layer, a first electrode formed in a linear shape, a second electrode formed in a linear shape and receiving an input of a voltage different from that of the first electrode, and a resistance layer having a higher electrical resistivity than the first electrode and the second electrode and the resistance layer of each of the plurality of unit-electrodes is arranged in a region between the first electrode and the second electrode in a plan view. And the liquid crystal element is characterized in that has a plurality of common input sections each having a unit-electrode group having a common input wiring, and the plurality of common input sections includes a first common input section and a second common input section that are arranged adjacent to each other, and the second common input section is arranged further from the optical axis than the first common input section, and the arrangement density of the unit-electrodes in each of the first common input section and the second common input section is configured to be denser on the side closer to the optical axis than on the side farther from the optical axis, and the width of the unit-electrode located at the position closest to the optical axis in the second common input section is larger than the width of the unit-electrode located at the position furthest from the optical axis in the first common input section.

(22) In the liquid crystal element described in (21), may be characterized in that the frequency of the voltage applied to the liquid crystal layer in the region of the unit-electrode group in the second common input section is equal to or higher than the frequency of the voltage applied to the liquid crystal layer in the region of the unit-electrode group in the first common input section.

(23) In the liquid crystal element described in (21), of the first electrode group and the second electrode group in the second common input section, the electrode group that accepts the input of the voltage with a higher effective value is characterized in that, a higher frequency voltage is input than the electrode group that, of the first electrode group and the second electrode group in the first common input section, accepts input of voltage with a higher effective value.

(24) The liquid crystal element according to any one of (21) to (23), may be characterized in that the difference of the effective value between the effective value of the voltage applied to the first electrode group and the effective value of the voltage applied to the second electrode group in the second common input section is greater than the difference between the effective value of the voltage applied to the first electrode group and the effective value of the voltage applied to the second electrode group in the first common input section.

(25) The liquid crystal device according to any one of (21) to (24), may be characterized in that at least one of a common input section in the plurality of common input sections has an auxiliary electrode in the two or more unit-electrodes of a group of unit-electrodes belonging to one common input section, an auxiliary electrode formed in a linear shape having a line width that is equal to or less than the line width of at least one of the first electrode and the second electrode, and the auxiliary electrodes in the two or more unit-electrodes may be connected to a common input wiring.

(26) Further, the liquid crystal element according to the present invention has a plurality of unit-electrodes that includes a liquid crystal layer, a first electrode formed in a linear shape, a second electrode formed in a linear shape and receiving an input of a voltage different from that of the first electrode, and a resistance layer having a higher electrical resistivity than the first electrode and the second electrode, and the resistance layer of each of the plurality of unit-electrodes is arranged in an area between the first electrode and the second electrode in a plan view, and the liquid crystal element has a plurality of (two, three or more) common input sections each having a unit-electrode group with common input wiring and corresponding to an area whose distance from the optical axis is within a predetermined range. The liquid crystal element is characterized in that the areas to which each of the plurality of (two or more than three) common input sections correspond are the areas having different distances from the optical axis, and each area includes the unit-electrode group, and the frequency of the voltage input to the common input unit corresponding to a range far from the optical axis is higher than the frequency of the voltage input to the common input unit corresponding to a range close to the optical axis.

(27) Further, the liquid crystal element according to the present invention has a plurality of unit-electrodes that includes a liquid crystal layer, a first electrode formed in a linear shape, a second electrode formed in a linear shape and receiving an input of a voltage different from that of the first electrode, and a resistance layer having a higher electrical resistivity than the first electrode and the second electrode and the resistance layer of each of the plurality of unit-electrodes is arranged in an area between the first electrode and the second electrode in a plan view, and the liquid crystal element has a plurality of (two, three or more) common input sections, each having a unit-electrode group with common input wiring and corresponding to an area whose distance from the optical axis is within a predetermined range. The liquid crystal element is characterized in that the area to which each of the plurality of (two or more than three) common input sections corresponds is the area having different distances from the optical axis, and the area includes the unit-electrode group, and the difference between the effective value of the voltage applied to the first electrode group of the common input section corresponding to the range far from the optical axis and the effective value of the voltage applied to the second electrode group of the common input section corresponding to the range far from the optical axis is larger than the difference between the effective value of the voltage applied to the first electrode group of the common input section corresponding to the range close to the optical axis and the effective value of the voltage applied to the second electrode group of the common input section corresponding to the range close to the optical axis.

(28) Furthermore, the eyeglasses according to the present invention are characterized in that they include the liquid crystal element described in any one of (1) to (27).

(29) Further, eyeglasses according to the present invention are eyeglasses equipped with the liquid crystal element described in (18), that include an eye detection section that acquires information regarding the movement of the wearer's eyes and the restriction unit is configured by a liquid crystal module that includes a plurality of pixel areas that can control the amount of transmitted light, each of the pixel areas functioning as a light shutter, and adjusts the amount of transmitted light of the plurality of pixel areas based on information regarding the eye movement.

Effect of the Invention

According to the present invention, it is possible to improve the image quality of a liquid crystal element in which a refractive index gradient is generated by a resistive layer and a saw-tooth-like refractive index distribution is generated in a liquid crystal layer.

EMBODIMENT OF THE INVENTION

First Embodiment

The liquid crystal element 100 according to the first embodiment of the present invention will be described below.

Figure 1A:
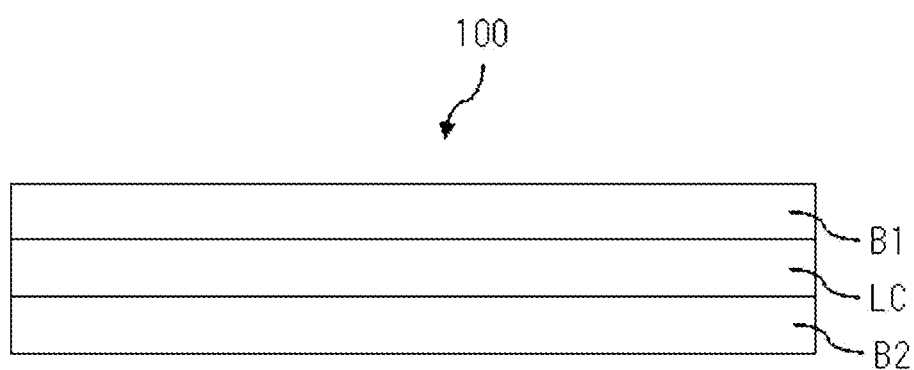
FIG. 1A is a schematic diagram for explaining a schematic configuration of a liquid crystal element according to a first embodiment of the present invention.
Figure 1B:
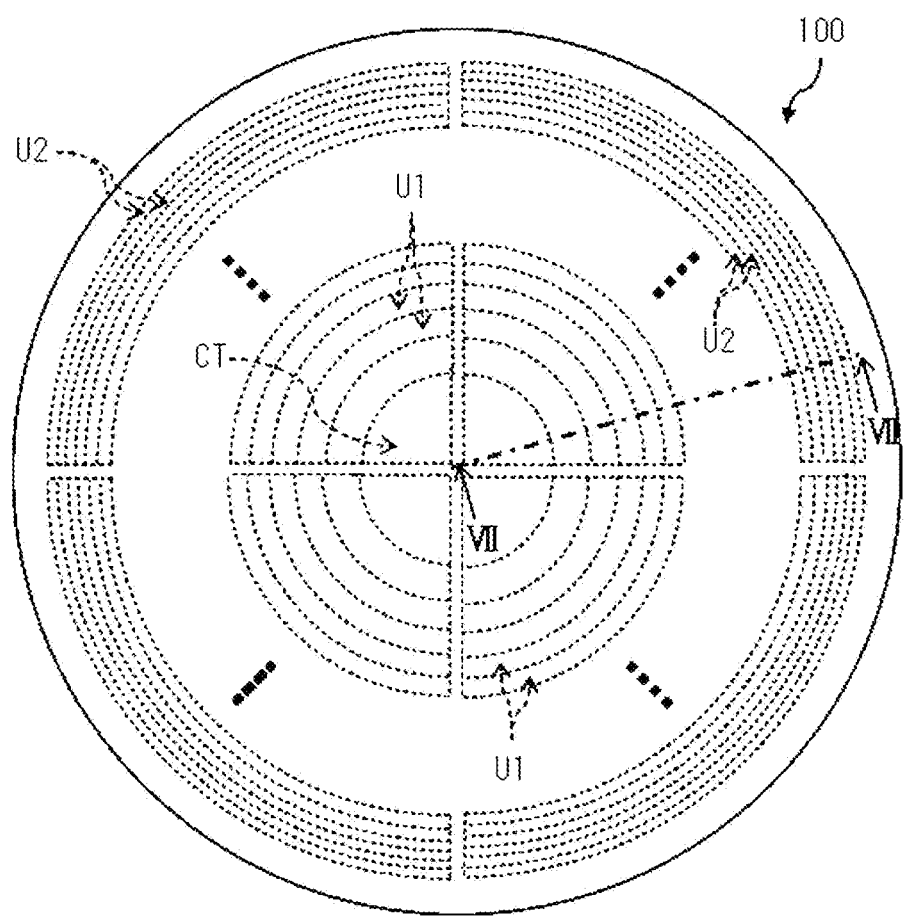
FIG. 1B is a schematic diagram for explaining a schematic configuration of the liquid crystal element in the first embodiment of the present invention.

FIG. 1A and FIG. 1B show schematic diagrams for explaining the schematic configuration of a liquid crystal element 100 according to the first embodiment. As shown in FIG. 1A, the liquid crystal element 100 has a liquid crystal layer LC sandwiched between a transparent substrate B1 and a transparent substrate B2. FIG. 1B is a diagram for schematically explaining the arrangement of electrode structures in the liquid crystal element 100. As shown in the figure, in the liquid crystal element 100, a center electrode CT is arranged at the center, and a plurality of arc-shaped unit-electrodes U1 and U2 are arranged concentrically around the center electrode CT.

In the liquid crystal element 100 of this embodiment, the unit-electrode U1 is arranged on the center side, and the unit-electrode U2 is arranged on the outer peripheral side. The widths of the unit-electrodes U1 and U2 decrease as they approach the outer periphery.

Figure 1C:
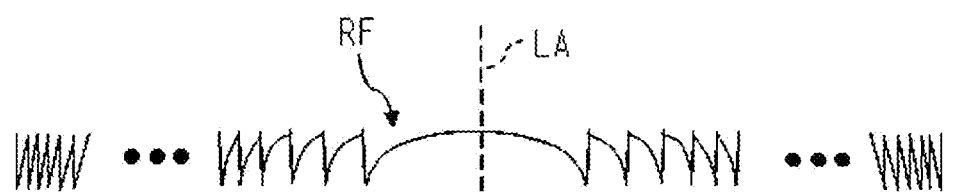
FIG. 1C is a schematic diagram of the refractive index distribution appearing in a cross section in an arbitrary direction passing through the center of the liquid crystal element in the first embodiment of the present invention.

FIG. 1C is a schematic diagram of a refractive index distribution RF appearing in a cross section in an arbitrary direction passing through the center of the liquid crystal element 100 in FIG. 1B. In the liquid crystal element 100, an electric field is applied to the liquid crystal layer LC by voltage being supplied to the center electrode CT and each of the unit-electrodes U1 and U2, thereby generating a saw-tooth refractive index distribution RF. Further, the refractive index distribution RF is formed to be substantially symmetrical about the optical axis LA, and, in the case of the planar view, the undulations of the refractive index are distributed concentrically.

The potential gradient generated from the center electrode CT and each unit-electrode U1, U2 corresponds to each saw-tooth undulation in the saw-tooth-like refractive index distribution, and the liquid crystal element 100 functions as a convex Fresnel lens whose focal length can be varied. In addition, the planar view in this specification refers to viewing from the direction of the optical axis LA in the liquid crystal element 100, that is, from a direction perpendicular to the transparent substrate B1.

Next, the unit-electrode U1 of the liquid crystal element 100 in this embodiment will be explained using FIG. 2 and FIG. 3, and then the unit-electrode U2 will be explained using FIG. 4 and FIG. 5, etc.

Figure 2:
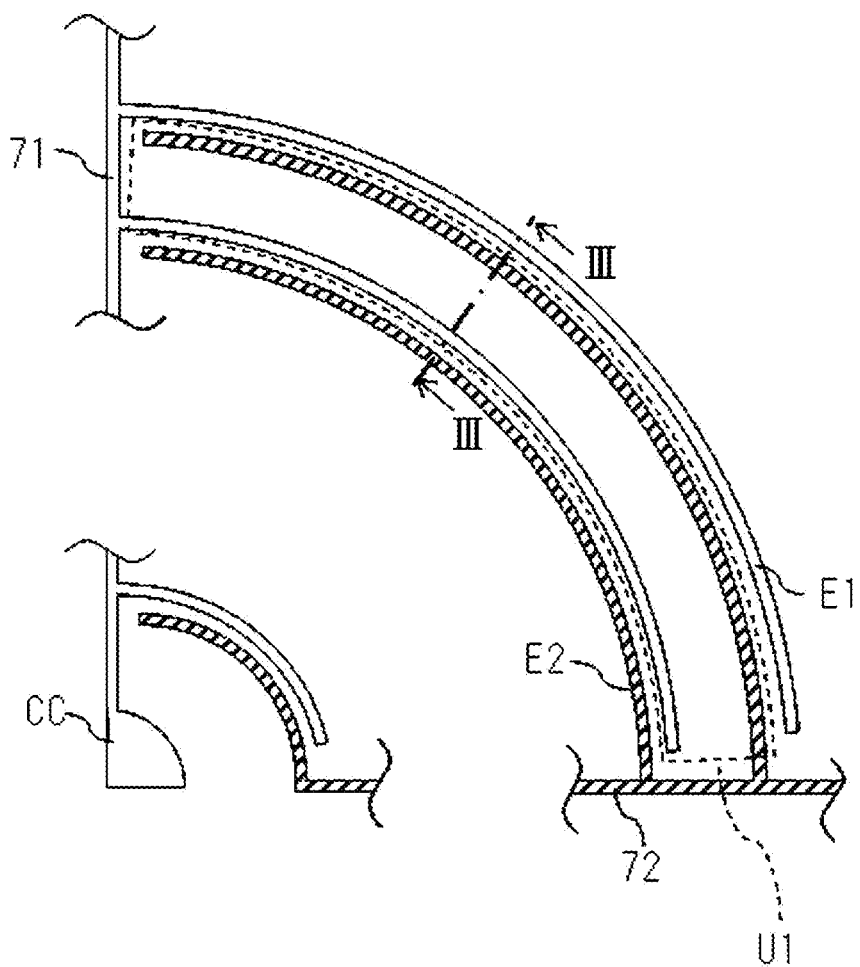
FIG. 2 is a schematic enlarged partial plan view for explaining a schematic planar configuration of a unit-electrode without an auxiliary electrode.

FIG. 2 is a schematic diagram for explaining the planar configuration of one unit-electrode U1.

As shown in FIG. 1B and FIG. 2, the unit-electrode U1 of this embodiment is defined by an arcuate region of approximately 90 degrees, and is configured to include the first electrode E1 and the second electrode E2, they are formed linearly. Furthermore, the unit-electrode U1 has a space between the first electrode E1 and the second electrode E2 that is wider than the line width of these, and by applying different voltages to the first electrode E1 and the second electrode E2, a potential gradient can be generated in the space.

The first electrode E1 and the second electrode E2 extend in an arc shape along the outer shape of each unit-electrode U1, and are connected to the first lead wire 71 and the second lead wire 72, respectively, to form a comb-tooth, or comb-teeth, shape. In the two unit-electrodes U1 that are adjacent to each other in the radial direction, the first electrode E1 of the unit-electrode U1 arranged on the outer circumference side and the second electrode E2 of the unit-electrode U1 arranged on the inner circumference side are placed adjacent to each other with a narrow space between them. In addition, the first lead wire 71 and the second lead wire 72 extend in the radial direction and are arranged between the unit-electrodes U1 (between the unit-electrodes U2) that are adjacent to each other in the circumferential direction in FIG. 1B.

Furthermore, the center electrode CT disposed at the center of the liquid crystal element 100 has a fan-shaped (or other shape such as a disk shape) core electrode CC instead of the first electrode E1, and a potential gradient can be generated in the region between the second electrode E2 connected to the lead wire 72 and the core electrode CC.

Figure 3:
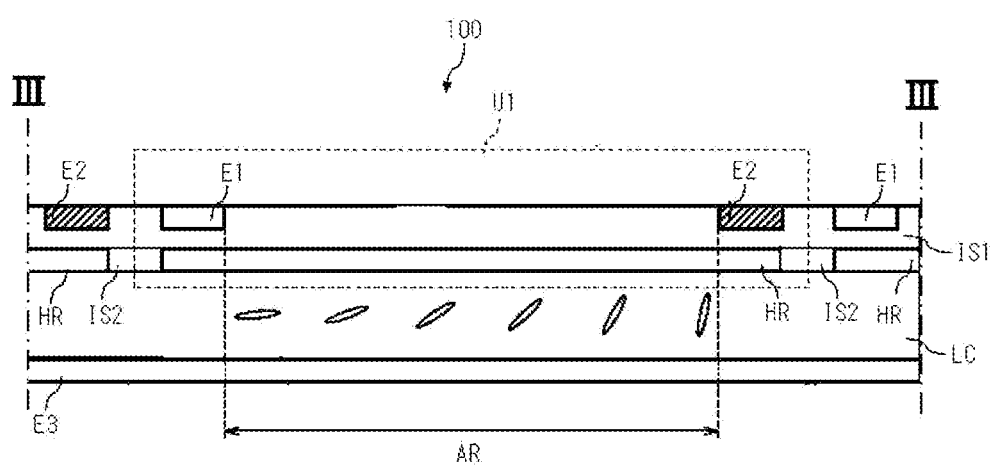
FIG. 3 is a diagram for explaining the III-III cross section in FIG. 2.

FIG. 3 is a schematic diagram for explaining the cross section in FIG. 2, but some components are omitted for simplification. The cross section in FIG. 2 is a radial cross section passing through a position corresponding to the center of the concentric arrangement of each unit-electrode U1. In the following, the structure of the unit-electrode U1 will be explained in more detail using FIG. 3, and the potential distribution applied to the liquid crystal layer LC by the unit-electrode U1 and the refractive index distribution caused by the same potential distribution will be explained.

The liquid crystal layer LC in FIG. 3 is sandwiched between a substrate located at the upper side of the figure (transparent substrate B1 in FIG. 1) and a substrate located at the lower side in the figure (transparent substrate B2 in FIG. 1). The former substrate is constructed by laminating a first electrode E1, a second electrode E2, an insulating layer IS1, a resistance layer HR, and an insulating layer IS2 on a glass substrate (not shown in FIG. 3), and the latter substrate is constructed by laminating a counter electrode E3 on a glass substrate (not shown in FIG. 3).

In the transparent substrate B1, a first electrode E1 and a second electrode E2 are formed on a glass substrate, and an insulating layer IS1 is laminated so as to bury the first electrode E1 and the second electrode E2. Further, a resistive layer HR is laminated on the insulating layer IS1, and an insulating layer IS2 is further arranged to fill in the space between the resistive layers HR. Furthermore, in the transparent substrate B2, a counter electrode E3 is formed on the glass substrate. Further, the transparent substrate B1 and the transparent substrate B2 have an alignment film at the interface of the liquid crystal layer LC, but this is not shown for simplicity.

The liquid crystal layer LC is, for example, a nematic liquid crystal, and the orientation of the liquid crystal becomes a homogeneous orientation in an environment without an electric field where no voltage is applied from the first electrode E1 and the second electrode E2, and the color of the liquid crystal is transparent. Further, the thickness of the liquid crystal layer LC in this embodiment is preferably 5 μm or more and 30 μm or less.

The first electrode E1 and the second electrode E2 are formed of a transparent conductive film such as ITO (Indium Tin Oxide). Further, as shown in FIG. 3, the area AR within the unit-electrode U1 is defined by the space between the first electrode E1 and the second electrode E2, and is interposed between the first electrode E1 and the second electrode E2. The width of the region AR is larger than the line widths of the first electrode E1 and the second electrode E2.

The insulating layer IS1 is a transparent electrical insulator, and is formed of silicon dioxide ($SiO_2$), for example. The insulating layer IS1 in this embodiment is laminated so as to bury the structures such as the first electrode E1, the second electrode E2, the first lead wire 71, and the second lead wire 72. Further, the insulating layer IS2 is laminated so as to fill the space between the resistive layers HR formed on the insulating layer IS1. The insulating layer IS2 may be formed by burying the resistive layer HR with silicon dioxide similar to the insulating layer IS1, or by burying the resistive layer HR with an alignment film extending at the interface of the liquid crystal layer LC.

The resistance layer HR has a larger electrical resistivity than the first electrode E1 and the second electrode E2, and a smaller electrical resistivity than the insulating layer IS1 made of silicon dioxide, for example, and is composed of a transparent film such as (ZnO). The sheet resistivity of the resistance layer HR is larger than each of the sheet resistivity of the first electrode E1 and the sheet resistivity of the second electrode E2, and is smaller than the sheet resistivity of the insulating layer IS1. The sheet resistivity of a material is the value obtained by dividing the electrical resistivity of the material by the thickness of the material.

Further, it is preferable that the electrical resistivity of the resistance layer be 1 $\Omega \cdot m$ or more and the sheet resistivity of the resistance layer HR be $1 \times 10^2$ $\Omega$/sq or more and or less than $1 \times 10^{11}$ $\Omega$/sq.

In addition, the planar shape of the resistance layer HR of the unit-electrode U1 in this embodiment is an arcuate shape with a width slightly narrower than the width of the unit-electrode U1, and it is formed by dividing it so that there is a space between the resistance layers HR of another adjacent unit-electrode U1. It is preferable that the resistance layer HR be formed so as to be electrically isolated from the resistance layer HR in another unit-electrode U1. Further, the resistance layer HR is arranged in a region AR between the first electrode E1 and the second electrode E2 when viewed in a plan view. As shown in FIG. 3, the resistance layer HR extends from directly below the first electrode E1 to directly below the second electrode E2, and it is preferable that it be formed so as overlap at least a portion of the first electrode E1 and at least a portion of the second electrode E2. However, it is not necessarily limited to such an aspect.

Further, as shown in FIGS. 2 and 3, the first electrode E1 of the unit-electrode U1 is formed along the second electrode E2 of another adjacent unit-electrode U1, and the second electrode E2 of the unit-electrode U1 is formed along the first electrode E1 of another adjacent unit-electrode U1. An insulating layer IS1 is disposed at the boundary between the first electrode E1 of the unit-electrode U1 and the second electrode E2 of the other adjacent unit-electrode U1, and between the second electrode E2 of the unit-electrode U1 and the first electrode E1 of the other adjacent the unit-electrode U1, and the resistance layers HR between adjacent unit-electrodes are separated by an insulating layer IS2. Furthermore, as shown in FIG. 3, the liquid crystal layer LC in this embodiment is configured such that the liquid crystal material can move toward another unit-electrode at the boundary between adjacent unit-electrodes.

In this embodiment, as shown in FIG. 2 and FIG. 3, the boundary between unit-electrodes is defined at the center of the insulating layer IS1 interposed between radially adjacent unit-electrodes.

Further, the unit-electrode U1 of this embodiment, the first electrode E1, the second electrode E2, and the resistance layer HR included therein extend in the circumferential direction of concentric circles and are formed in an arc shape, and these widths refer to the size corresponding to the thickness in the radial direction of the concentric circles.

The width of the insulating layer IS1 interposed between two radially adjacent unit-electrodes U1 (between unit-electrodes U2) may be, for example, 15 µm or less and 5 µm or more. In addition, the width may be narrowed depending on the distance from the optical axis LA of the liquid crystal element 100.

The counter electrode E3 is formed in a planar shape on the transparent substrate B2 using a transparent conductive film such as ITO, and is supplied with a ground potential (0V). However, the counter electrode E3 is not necessarily limited to such a mode.

Next, the potential distribution and refractive index distribution caused in the liquid crystal layer LC by the unit-electrode U1 will be explained.

First, a first voltage V1 is supplied to the first electrode E1 via the first lead wire 71 based on an input from a control section (not shown) in the liquid crystal element 100. Similarly, the second voltage V2 is also supplied to the second electrode E2 from the control section via the second lead wire 72. Although the first voltage V1 and the second voltage V2 in this embodiment are rectangular wave alternating current voltages and have the same frequency and phase, the phases and frequencies do not necessarily have to be same, and it does not have to be rectangular wave AC voltage. Further, the maximum amplitude of the first voltage V1 and the second voltage V2 is set to be, for example, 10 V or less, and the frequency is set to, for example, 10 Hz or more and 5 MHz or less.

Here, the first voltage V1 and the second voltage V2 are different voltages, and when the second voltage V2 has a higher effective value than the first voltage V1, as shown in FIG. 3, liquid crystal molecules change from a state parallel to the transparent substrate B1 to a state standing vertically, from the first electrode E1 side to the second electrode E2 side. Specifically, a liquid crystal layer LC is interposed between the first electrode E1 and the second electrode E2 and the counter electrode E3, and a resistive layer HR is further arranged between the first electrode E1 and the second electrode E2, in planar view, thereby a potential distribution that gradually changes from the potential corresponding to the second voltage V2 to the potential corresponding to the first voltage V1 is generated, and as a result, each unit-electrode U1 causes a refractive index gradient in the liquid crystal layer LC. Further, the refractive index gradient caused in the liquid crystal layer LC changes depending on the width of the region AR in the unit-electrode U1, and the gradient tends to become steeper as the width becomes narrower.

Next, the configuration of the unit-electrode U2 in this embodiment will be explained using FIG. 4 and FIG. 5. FIG. 4 is a schematic diagram for explaining the planar configuration of the unit-electrode U2, and shows an example of the unit-electrode U2 of this embodiment, and FIG. 5 is a diagram for explaining the V-V cross section in FIG. 4. Like the unit-electrode U1, the unit-electrode U2 is configured to be able to generate a refractive index gradient in the liquid crystal layer LC in the region AR.

Figure 4:
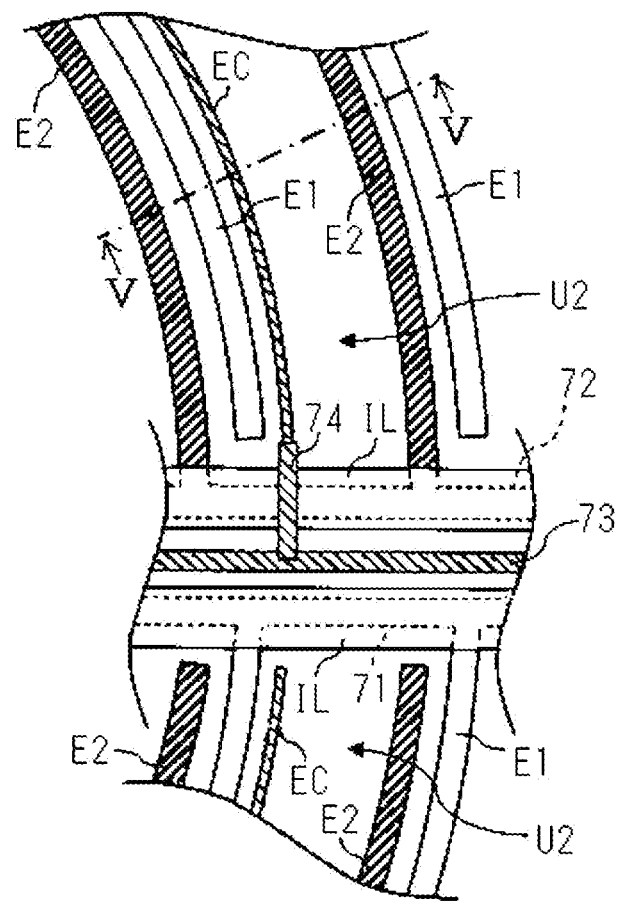
FIG. 4 is a schematic enlarged partial plan view for explaining a schematic planar configuration of a unit-electrode of a liquid crystal element in the first embodiment that includes an auxiliary electrode.

FIG. 4 shows two unit-electrodes U2 arranged adjacent to each other in the circumferential direction, and a first lead wire 71 and the like are interposed between the two unit-electrodes U2. Further, as shown in FIGS. 4 and 5, the unit-electrode U2 is different from the unit-electrode U1 in that it has an auxiliary electrode EC, and is common to the unit-electrode U1 in that it has the configuration of the first electrode E1, the second electrode E2, etc.

The auxiliary electrode EC is made of a transparent conductive film such as ITO, like the first electrode E1 and the like. As shown in FIG. 4, the auxiliary electrode EC in this embodiment is formed in an arc shape along the first electrode E1. Further, the auxiliary electrode EC is connected to a third lead wire 73 via a lead wire connection section 74, and is supplied with voltage from a control section (not shown). Further, the first lead wire 71 and the second lead wire 72 are covered with an insulating layer IL, and the lead wire connecting section 74 is connected to the third lead wire 73 and the auxiliary electrode EC by straddling the first lead wire 71 covered with the insulating layer IL. Since the auxiliary electrode EC of the other unit-electrode U2 is also connected, to the third lead wire 73, the auxiliary electrode EC and the third lead wire 73 have a comb-like structure.

In particular, the auxiliary electrode EC is formed in a linear shape with a line width that is equal to or less than the line width of at least one of the first electrode E1 and the second electrode E2, so that the refractive index distribution of the area corresponding to the unit-electrode U2 is improved, and the image quality of the liquid crystal element 100 is improved by improving the distribution. As shown in FIG. 1B, in the liquid crystal element 100, unit-electrodes have various widths and are arranged in radial and circumferential directions, but when the width of the unit-electrode becomes narrow, defects such as local stagnation and the disclination of liquid crystal molecules are likely to occur. In the liquid crystal element 100 equipped with unit-electrodes each having a resistance layer HR, a dominant potential gradient is generated in the region AR by the first electrode E1 and the second electrode E2, but when the line width of the auxiliary electrode EC is larger than the line width of the first electrode E1 or the second electrode E2, there is a high possibility that the potential gradient of the region AR will be adversely affected. However, by extending the auxiliary electrode EC within the area AR with the line width that is less than or equal to the line width of the first electrode E1 and the second electrode E2, it is possible to improve the refractive index distribution in the area corresponding to the unit-electrode U2 while keeping the influence on the potential gradient in the liquid crystal layer LC. Moreover, since the thickness of the liquid crystal layer LC is 5 µm or more and 30 µm or less, even if the line width of the auxiliary electrode EC is the same as that of the first electrode E1 or smaller than the first electrode E1 etc., it is thought that it contributes to improving the refractive index distribution.

Further, in the liquid crystal element 100 of the present embodiment, the unit-electrode U2 with the auxiliary electrode EC is arranged when the width of the region AR is 200 µm or less, and the unit-electrode U1 without the auxiliary electrode is arranged when the line width of the region AR is larger than 200 µm.

As shown in FIG. 1B, a unit-electrode U1 is arranged on the center side (closer to the optical axis) of the liquid crystal element 100, and a unit-electrode U2 is arranged on the outer periphery side (farther from the optical axis) of the liquid crystal element 100, but in the following the unit-electrode U2 and the auxiliary electrode EC will be explained in more detail below using FIG. 5.

Figure 5:
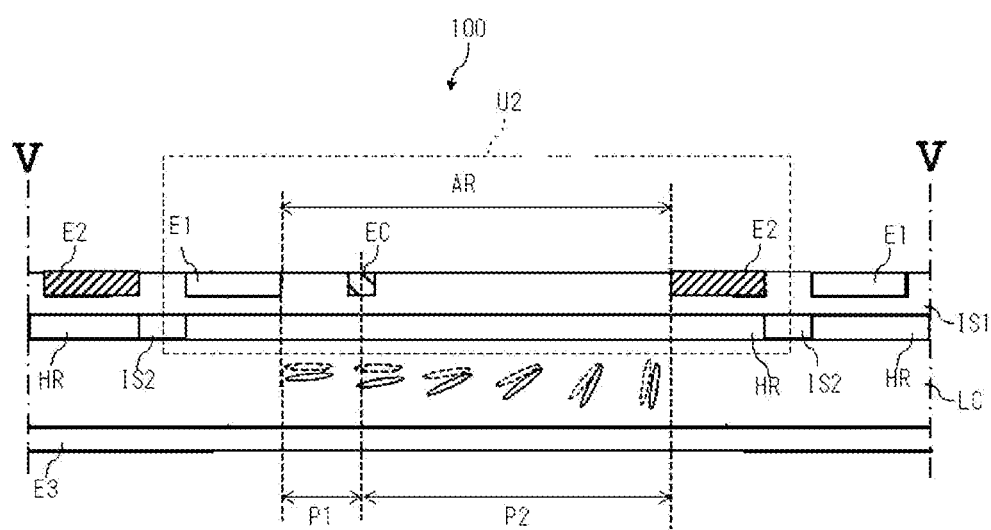
FIG. 5 is a diagram for explaining the V-V cross section in FIG. 4.

As shown in FIG. 5, the unit-electrode U2 has an auxiliary electrode EC in a region AR between the first electrode E1 and the second electrode E2. The line width of the auxiliary electrode EC may be narrower than the line width of the first electrode E1 and the second electrode E2, and may be ¾ of the line width of the first electrode E1 and the second electrode E2, and may be ⅔ or less, ½ or less, or ⅓ or less.

Further, the auxiliary electrode EC may be formed with a specific line width of 12 µm or less, 8 µm or less, or 6 µm or less. In addition, the auxiliary electrode EC may be composed of a colored metal film (for example, copper or aluminum) that has higher conductivity than a transparent conductive film such as ITO, whereby the line width can be made thinner.

Further, the first voltage V1 and the second voltage V2 are supplied to the first electrode E1 and the second electrode E2, as in the case of the unit-electrode U1. The first voltage V1 and the second voltage V2 are different voltages in order to generate a potential gradient in the region AR, but as the width of the region AR becomes narrower to 120 µm or less, or 90 µm or less, or 60 µm or less, it is thought that the behavior of liquid crystal molecules is more likely to be influenced by factors that are difficult to predict, and it becomes difficult to obtain a refractive index distribution that corresponds to the width size of the unit-electrode gradient. However, in this embodiment, the controllability of the behavior of liquid crystal molecules in the region AR is improved by arranging the auxiliary electrode EC with the line width as described above in the unit-electrode U2, thereby improving the refractive index distribution.

In addition, the liquid crystal molecules are indicated by the solid line shown in the liquid crystal layer LC in FIG. 5. This figure shows an example of the expected behavior of liquid crystal molecules, when a voltage with an effective value of 0.5V as the first voltage to the first electrode, 2.0V as the second voltage to the second electrode, and 1.0V as the auxiliary voltage to the auxiliary electrode is applied. Further, the auxiliary voltage V3 of this embodiment is a rectangular wave voltage having the same frequency and phase as the first voltage V1 and the like. Furthermore, the liquid crystal molecules indicated by the broken line shows an example of expected behavior of liquid crystal molecules when the same voltage as above is applied to the first electrode E1 and the second electrode E2 in a state where the auxiliary electrode EC is not present (or a state where no voltage is applied to the auxiliary electrode EC).

If the auxiliary electrode EC is not present, as shown in FIG. 5 by the broken line, liquid crystal molecules are expected to occur relatively widely in the place, where the liquid crystal molecules on the first electrode E1 side, which is the low potential side, will not rise enough and the refractive index gradient will be insufficient. On the other hand, when a voltage is applied to the auxiliary electrode EC, as shown by the solid line liquid crystal molecules, the liquid crystal layer LC is driven so that the liquid crystal molecules gradually rise, thereby making it possible to improve the refractive index gradient within the area AR.

In addition, in FIG. 5 and the like, the auxiliary electrode EC is arranged closer to the first electrode E1 than the second electrode E2, and the distance between the auxiliary electrode EC and the first electrode E1 is narrower than the distance between the auxiliary electrode EC and the second electrode E2. When the effective value of the first voltage V1 is lower than the second voltage V2, the rise of liquid crystal molecules tends to be insufficient on the side closer to the first electrode E1 than the center of the area AR, and therefore, the refractive index distribution of the unit-electrode U2 can be improved by supplying the auxiliary voltage V3 from the auxiliary electrode EC placed along and near the first electrode E1. As for the arrangement of the auxiliary electrode EC, for example, the distance between the auxiliary electrode EC and the first electrode E1 should be set to ½ or less, or ⅓ or less, or ¼ or less of the distance between the auxiliary electrode EC and the second electrode E2.

Further, when the auxiliary electrode EC is arranged along the first electrode E1 as shown in FIG. 5 etc. the auxiliary voltage V3 applied to the auxiliary electrode is set to be higher than the potential corresponding to the position of the auxiliary electrode EC when it is thought that a linearly transitioning potential gradient is occurring between the first electrode E1 and the second electrode E2. Specifically, when the distance between the center of the auxiliary electrode EC and the first electrode E1 is P1, and the distance between the center of the auxiliary electrode EC and the second electrode E2 is P2, the effective value V1E of the first voltage V1, the effective value V2E of the second voltage V2, and the effective value V3E of the auxiliary voltage V3 are set so as to satisfy the following equation (1).

$$V3_E > (V2_E - V1_E) \times \frac{P1}{P1 + P2} + V1_E \qquad (1)$$

By setting the auxiliary voltage V3 as described above, it is possible to improve the refractive index distribution of the unit-electrode U2 by making it easier for molecules stagnant on the side near the first electrode E1, which is the low potential side, to stand up. Further, the effective value of the auxiliary voltage V3 may be set to be, for example, 1.1 times or more than 1.2 times the right side of the above equation.

Further, as the auxiliary voltage V3 is applied to the auxiliary electrode EC, for example, it is preferable to apply a voltage having an effective value equal to or higher than the threshold voltage of the liquid crystal material included in the liquid crystal layer LC. By applying a voltage higher than the threshold voltage to the auxiliary electrode EC having a narrow line width, the liquid crystal molecules are locally driven (or easily driven) in the area AR, and the refractive index gradient at the unit-electrode U2 can be improved by improving the behavior of the liquid crystal molecules in the portions where they were stagnant due to insufficient rise. In addition, the effective value V1E in the above equation (1) may be 0V or a value larger than 0V. Furthermore, by setting the effective value of the first voltage V1, which is on the low potential side, to a value greater than 0V and lower than the threshold voltage, it is possible to easily generate a refractive index gradient in the region close to the first electrode E1, however the present invention is not limited to this embodiment.

The threshold voltage Vth of the liquid crystal material is expressed by the following equation (2).

$$V_{th} = \pi \sqrt{K^{\text{eff}}/\varepsilon_0 \Delta \varepsilon} \qquad (2)$$

K33 (bend elastic constant) is used for Keff, ε0 is the dielectric constant in a vacuum, and Δε is the dielectric anisotropy. Furthermore, 5 CB is used as the liquid crystal material filled in the liquid crystal layer LC of the liquid crystal element 100 of this embodiment. The threshold voltage of 5 CB can be determined by using the specification values for K33 and Δε, and is 0.934V.

Further, as the auxiliary electrode EC, an auxiliary voltage V3 may be applied so that a vertical electric field is applied to the liquid crystal material included in the liquid crystal layer LC so that the effective value is higher than the voltage at which the retardation value starts to change. The voltage at which such a change in retardation value begins can be measured in the process of increasing the voltage between the flat electrodes, in a state sandwiching the liquid crystal material between two substrates on which planar electrodes are formed, and while maintaining room temperature (20° C.) conditions.

The retardation value can be measured using a micro area polarization analyzer (OPTIPRO micro) manufactured by SHINTECH, and the wavelength when measuring the retardation value is 550 nm and the spot diameter is φ3 μm. In addition that retardation (phase delay) is expressed as Δn×d. The symbol Δn is the refractive index anisotropy of the liquid crystal layer LC, and the symbol d corresponds to the thickness of the liquid crystal layer LC. It is also possible to calculate the refractive index gradient (spatial gradient of retardation) in a unit-electrode in a similar manner. In addition, the liquid crystal element 100 of this embodiment may be one in which the polarity of the Fresnel lens, such as a convex type or a concave type, is fixed so that, for example, the voltage applied to the first electrode E1 is always lower than the voltage applied to the second electrode E2. Furthermore, in cases where the polarity of the Fresnel lens in the liquid crystal element 100 is not fixed and the voltage applied to the second electrode E2 is lower than the voltage applied to the first electrode E1, no voltage may be applied to the auxiliary electrode EC arranged along the first electrode E1, or the auxiliary voltage V3 may be set as appropriate.

Figure 6:
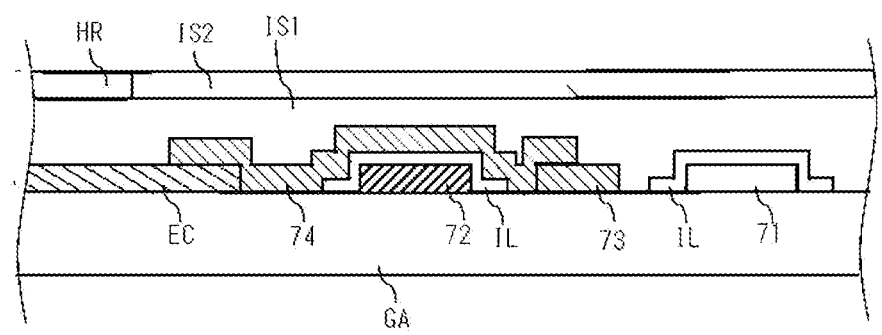
FIG. 6 is a schematic cross-sectional view of a part generally perpendicular to the extending direction of each lead wire in FIG. 4.

The unit-electrode U1 and the unit-electrode U2 have been specifically explained above. Below, the configuration of the first lead wire 71 and the like, the overall arrangement of the unit-electrodes U1 and U2 of the liquid crystal element 100 of this embodiment, etc. will be explained. FIG. 6 is a schematic cross-sectional view of a predetermined location approximately perpendicular to the extending direction of each lead wire in FIG. 4, and it is a cross section, including an auxiliary electrode EC, a third lead wire 73, a lead wire connection part 74. Each lead wire in this embodiment is formed on the same level as the auxiliary electrode EC, etc. (formed on the glass substrate GA), and an insulating layer IL is further arranged to cover the first lead wire 71 and the second lead wire 72. The auxiliary electrode EC is connected to a third lead wire 73 by straddling the second lead wire 72 covered with the insulating layer IL, and the auxiliary electrode EC and the third lead wire 73 are connected via the lead wire connection part 74 laminated on the insulating layer IL. These structures are also buried by an insulating layer IS1. In addition, the lead wire connection part 74, the first lead wire 71, the second lead wire 72, and the third lead wire 73 are made of a transparent conductive film such as ITO, like the first electrode E1, etc., and the insulating layer IL is made of an insulating film and, like the layer IS1, it is made of silicon dioxide or the like. In addition, at the locations where each lead wire extends in the radial direction, these and the resistance layer HR are arranged so that they do not overlap, and as shown in FIG. 6, an insulating layer IS2 stacked between each resistance layer HR.

Figure 7:
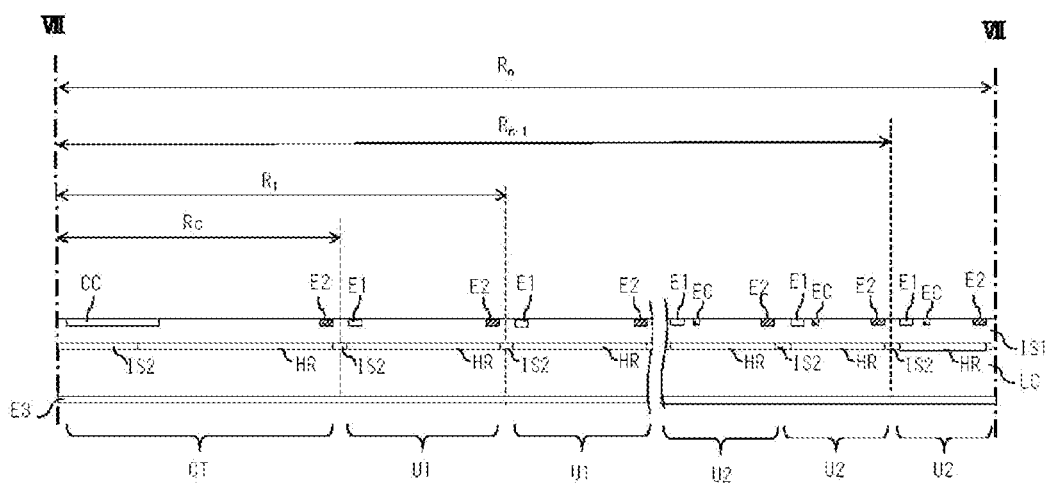
FIG. 7 is a schematic sectional view for explaining the state of the VII-VII cross section in FIG. 1B.

FIG. 7 shows the state of the VII-VII cross section in FIG. 1B, and is a radial cross-sectional view passing near the optical axis of the liquid crystal element 100. A center electrode CT including a core electrode CC is arranged at the center of the liquid crystal element 100, and unit-electrodes U1 and U2 are arranged around the center electrode CT in succession in the radial direction. In this specification, the boundary between the center electrode CT and the unit-electrode U1 is defined by the center of the insulating layer IS1 interposed therebetween, and the radius Rc of the center electrode CT corresponds to the distance from the optical axis of the liquid crystal element 100 (center of concentric arrangement of the unit-electrode) to the boundary.

Furthermore, as shown in FIG. 7, let the radius of the unit-electrodes U1 and U2 be Rn, where the subscript n is an integer greater than or equal to 1 and less than or equal to N, which is set in ascending order from the unit-electrode with the smallest radius to the unit-electrode with the largest radius within the plurality of unit-electrodes U1 and U2, and that is assigned to each of a plurality of unit-electrodes.

For example, a numerical value such as 50 or 60 may be assigned to N, or a larger numerical value may be assigned to increase the diameter of the liquid crystal element 100. Furthermore, as shown in the figure, the size of the radius of the unit-electrodes U1 and U2 corresponds to the distance from the optical axis of the liquid crystal element 100 to the boundary on the outer circumferential side (second electrode E2 side) of the unit-electrodes U1 and U2. In addition, for the unit-electrode U2 located at the outermost circumference of the liquid crystal element 100 and having a radius Rn, the second electrode E2 may be arranged inside the position of radius Rn with a gap similar to that of the unit-electrode U2 of radius Rn−1.

The radius Rn of the unit-electrodes U1 and U2 of this embodiment is expressed by the following equation (3).

$$R_n = (n+1)^{1/2} \times R_C \qquad (3)$$

Next, the potential distribution and retardation distribution caused in the unit-electrode will be described using simulation results for a unit-electrode having an auxiliary electrode EC and a unit-electrode not having an auxiliary electrode EC.

Figure 8A:
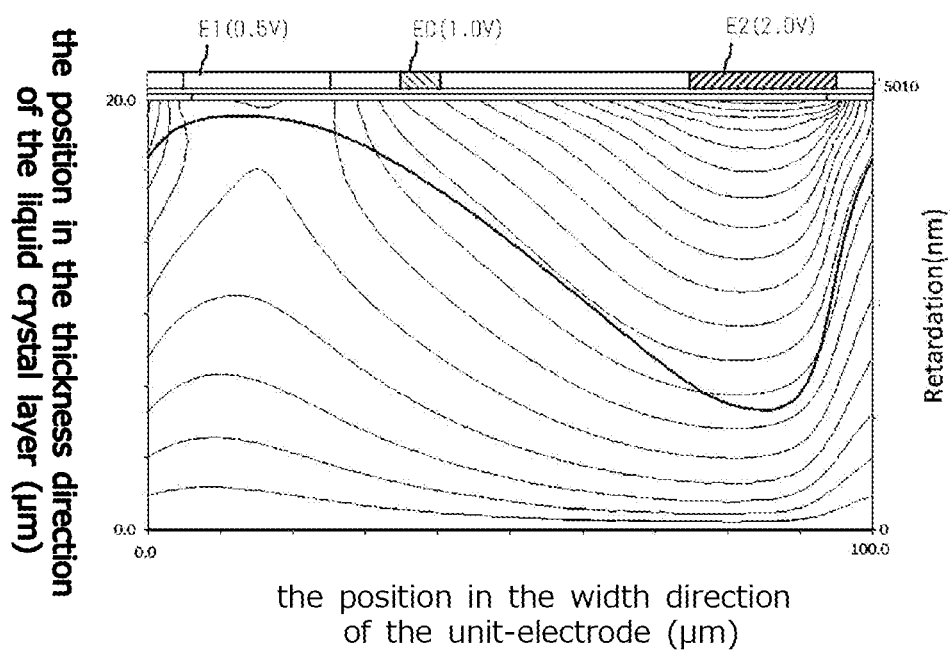
FIG. 8A is a diagram showing simulation results of potential distribution and retardation distribution in the liquid crystal layer at locations overlapping with unit-electrodes having an auxiliary electrode.
Figure 8B:
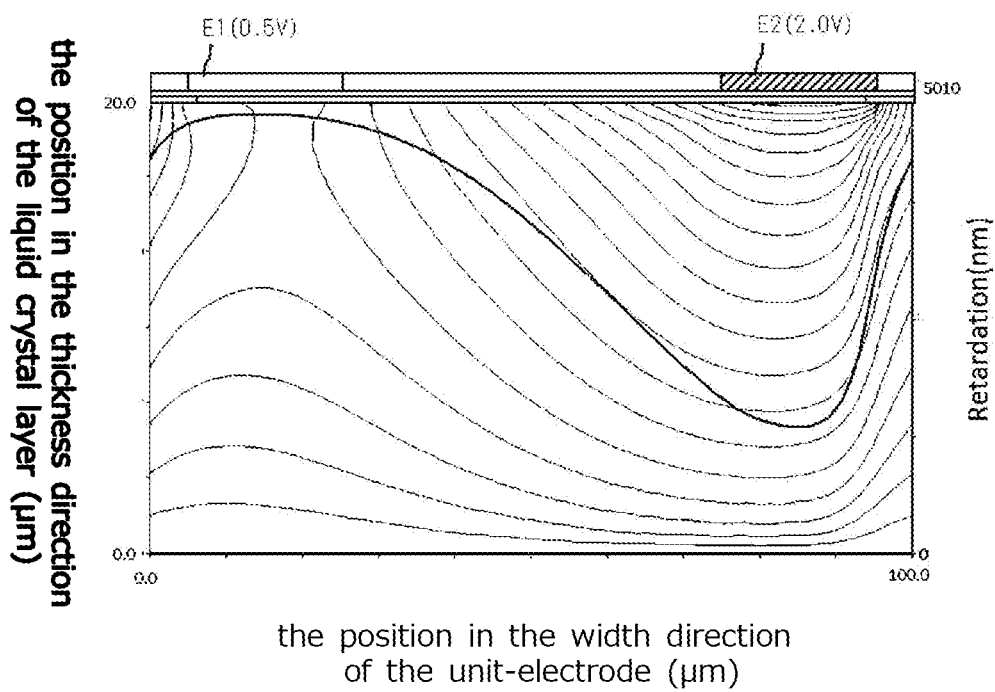
FIG. 8B is a diagram showing simulation results of potential distribution and retardation distribution in the liquid crystal layer at locations overlapping with unit-electrodes not having an auxiliary electrode.

FIGS. 8A and 8B are diagrams showing simulation results of potential distribution and retardation distribution caused in the liquid crystal layer at locations overlapping with unit-electrodes. In FIG. 8A and FIG. 8B, the horizontal axis identifies the coordinates indicating the position in the width direction of the unit-electrode, and the vertical axis identifies the coordinates indicating the position in the thickness direction of the liquid crystal layer (left axis) and shows the size of the retardation value (right axis). Further, the thick solid lines in FIG. 8A and FIG. 8B indicate retardation values corresponding to the positions on the horizontal axis, and the thin solid lines indicate equipotential lines within the liquid crystal layer. In addition, an LCD Master 2D manufactured by SHINTECH Co., Ltd. was used for the simulation in this specification.

The conditions for the simulation in FIG. 8A are that the width of the unit-electrode is 100 μm, the width of both the first electrode E1 and the second electrode E2 is 20 μm, the width of the auxiliary electrode EC is 5 μm, and the thickness of the liquid crystal layer is 20 μm. Further, the distance between the first electrode E1 and the second electrode E2 (the width of the area AR) is 50 μm, the distance between the first electrode E1 and the auxiliary electrode EC is 10 μm, and the distance between the second electrode E2 and the auxiliary electrode EC is 35 μm. Further, as shown in the figure, the effective value of the first voltage V1 applied to the first electrode E1 is 0.5V, the effective value of the second voltage V2 applied to the second electrode E2 is 2.0V, and the effective value of the auxiliary voltage V3 applied to the electrode EC is 1.0V. Further, in FIG. 8A, the lower limit value of the retardation value (right axis) is 0 nm and the upper limit value is 5010 nm, and the same holds true for the subsequent diagrams showing the simulation results.

FIG. 8B differs from the simulation conditions in FIG. 8A in that it does not have the auxiliary electrode EC, but other conditions (width of the unit-electrode, thickness of the liquid crystal layer, width of the region AR, width or applied voltage of the first electrode E1 and the second electrode E2) are the same as the simulation conditions in FIG. 8A.

First, regarding the potential distribution, in FIG. 8B, the equipotential lines near the substrate where the first electrode E1 etc. are formed (the upper position in the figure) becomes denser toward the second electrode E2 side and sparse toward the first electrode E1 side, whereas in FIG. 8A, the sparseness of the equipotential lines is relaxed due to the presence of the auxiliary electrode EC. More specifically, in FIG. 8A, there are three equipotential lines between the first electrode E1 and the auxiliary electrode EC, but in FIG. 8B, there is only about one equipotential line at the corresponding location.

Next, regarding the retardation distribution, in FIG. 8B, the slope near the first electrode E1 is poor and the change in retardation value is small, but in FIG. 8A, since the potential distribution has been improved, the magnitude of the slope is maintained to some extent even near the first electrode E1, and the slope of the retardation value is improved.

In a unit-electrode with a retardation curve as shown in FIG. 8B, light is scattered near the first electrode E1 of the unit-electrode, which deteriorates the light collection performance of the divergence performance and causes optical aberration and the like, which deteriorates the image quality of the liquid crystal element 100 as a Fresnel lens, however, by arranging the auxiliary electrode EC to form a unit-electrode with a retardation curve as shown in FIG. 8A, the image quality of the liquid crystal element 100 is improved.

Furthermore, as shown in FIG. 1B and equation (3), the width of the unit-electrode gradually decreases as it approaches the outer periphery of the liquid crystal element 100.

As the width of the unit-electrode becomes smaller, not only the effects caused by the physical characteristics of the liquid crystal material begin to become apparent, but also the effects of manufacturing constraints such as minimum design dimensions become apparent, making it difficult to control the refractive index gradient. As shown and explained in FIG. 8A and FIG. 8B, a potential distribution occurs in the liquid crystal layer LC, but a slight distortion in the equipotential lines may cause disclination, and as the width of the unit-electrode decreases, unexpected defects are more likely occur. Therefore, in the liquid crystal element 100 according to the present embodiment, by changing the position where the auxiliary electrode EC is arranged in the plurality of unit-electrodes U2 having different widths, the image quality can be improved by making defects such as stagnation and disclination of the liquid crystal molecules less likely to occur in each of the plurality of unit-electrodes U2. In other words, the auxiliary electrode EC suppresses the occurrence of the previous defects, thereby improving the image quality. Specifically, in a plurality of unit-electrodes U2 having different widths of the region AR, by appropriately changing the ratio of P1 and P2 (ratio of distance P1 from the first electrode E1 to the center of the auxiliary electrode EC to distance P2 from the second electrode E2 to the center of the auxiliary electrode EC) in FIG. 5 and arranging them, distortion is less likely to occur in the equipotential lines.

Furthermore, in the liquid crystal element 100 of this embodiment, the image quality may be improved by changing the width of the auxiliary electrode in the plurality of unit-electrodes U2 having different widths of the regions AR. The liquid crystal element 100 in this case may include a unit-electrode U2 having an auxiliary electrode formed of a transparent conductive film, and a unit-electrode U2 having an auxiliary electrode formed of a colored metal film. Colored metal films such as copper and aluminum have higher conductivity than transparent conductive films such as ITO, therefore design constraints such as minimum design dimensions are relaxed, and the line width of the auxiliary electrode formed of a colored metal film can be made thinner, and the line width can also be made smaller than 5 μm or even less than 5 μm. Therefore, for example, when the width of the area AR is less than or equal to a predetermined value, the auxiliary electrode may be formed using a colored metal film, and when the width is larger than the predetermined value, the auxiliary electrode may be formed using a transparent conductive film, and the width of the area AR of the unit-electrode U2 having the auxiliary electrode formed of a colored metal film may be narrower than the width of the area AR of the unit-electrode U2 having the auxiliary electrode formed of a transparent conductive film.

Second Embodiment

Next, a liquid crystal element 100 according to a second embodiment of the present invention will be described. The liquid crystal element 100 in the second embodiment includes a plurality of unit-electrodes U1 and U2, similar to the schematic configuration shown in FIG. 1B, but a plurality of auxiliary electrodes are arranged in the unit-electrode U2.

Figure 9:
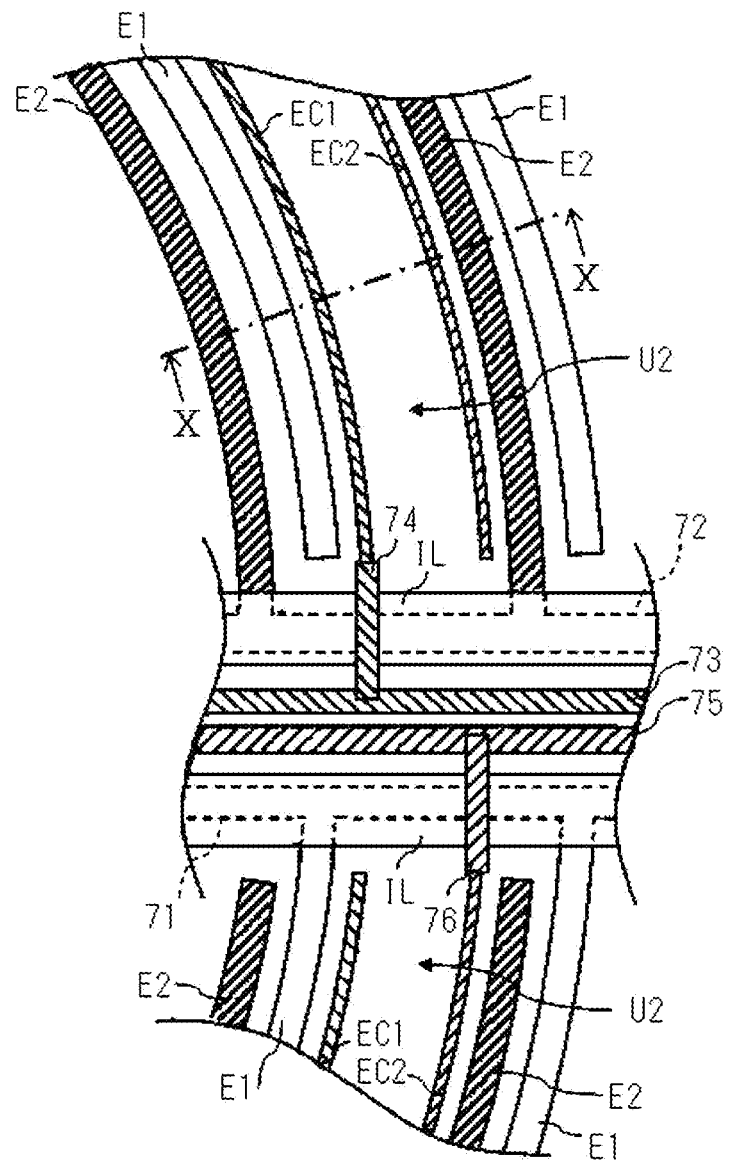
FIG. 9 is a partially enlarged schematic plan view for explaining the planar configuration of a unit-electrode including an auxiliary electrode in the second embodiment of the present invention.
Figure 10:
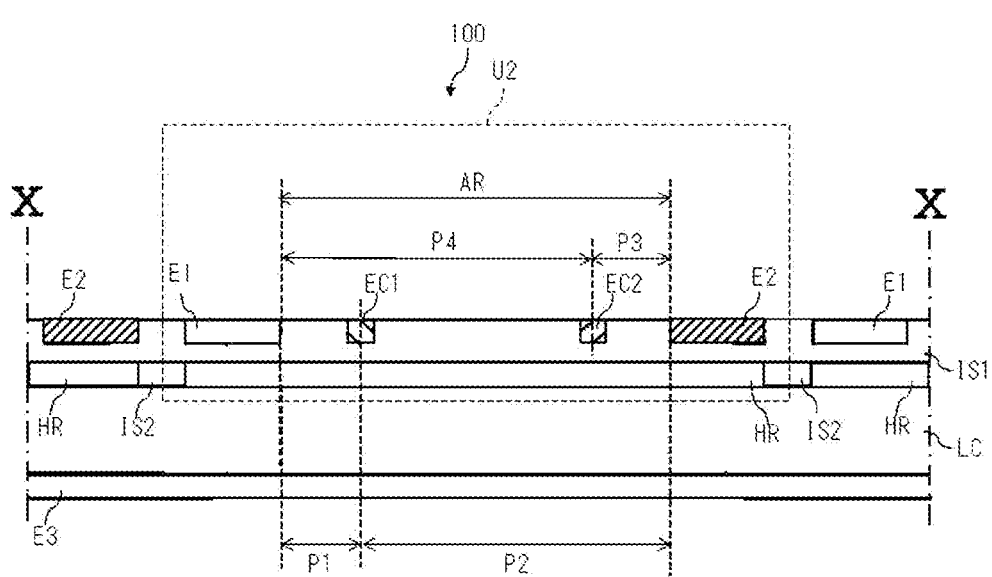
FIG. 10 is a schematic cross-sectional view for explaining the X-X cross section in FIG. 9.

FIG. 9 is a partially enlarged schematic plan view for explaining the planar configuration of the unit-electrode U2 provided with the auxiliary electrode in the second embodiment, and FIG. 10 is a schematic cross-sectional view for explaining the X-X cross section in FIG. 9.

FIG. 9 shows a planar configuration of two unit-electrodes U2 adjacent in the circumferential direction. As shown in these figures, the unit-electrode U2 in the second embodiment differs from the first embodiment in that it has two auxiliary electrodes (first auxiliary electrode EC1 and second auxiliary electrode EC2). The liquid crystal element 100 of the second embodiment, with a first auxiliary electrode EC1 disposed along the first electrode E1 and a second auxiliary electrode EC2 disposed along the second electrode E2, can improve the image quality, depending on both polarities, when functioning as a convex Fresnel lens and when functioning as a concave Fresnel lens.

The configuration of the unit-electrode U2 of the liquid crystal element 100 of the second embodiment will be specifically described below with reference to FIG. 9 and FIG. 10.

As shown in FIG. 9, the first auxiliary electrode EC1 is arranged along the first electrode E1 and connected to the third lead wire 73. The second auxiliary electrode EC2 is arranged along the second electrode E2 and connected to the fourth lead wire 75. Further, the first auxiliary voltage V3 is supplied from the third lead wire 73 to the first auxiliary electrode EC1, and the second auxiliary voltage V4 is supplied from the fourth lead wire 75 to the second auxiliary electrode EC2. The first lead wire 71 is covered with an insulating layer IL, and the lead wire connecting portion 76 connects the second auxiliary electrode EC2 and the fourth lead wire 75 by straddling the first lead wire 71 covered with the insulating layer IL. Similarly, the second lead wire 72 is covered with the insulating layer IL, and the lead wire connecting portion 74 is connected to the first auxiliary electrode EC1 and the third lead wire 73 by straddling the second lead wire 72 covered with the insulating layer IL.

In addition, the third lead wire 73 extends in the radial direction, like the first lead wire 71 etc., and is connected to the first auxiliary electrode EC1 of the other unit-electrode U2 so that the first auxiliary electrode EC1 and the third lead wire 73 has a comb-like structure. The fourth lead wire 75 also extends in the radial direction, like the first lead wire 71 etc., and is connected to the second auxiliary electrode EC2 of the other unit-electrode U2, so that the second auxiliary electrode EC2 and the fourth lead wire 75 has a comb-like structure.

As shown in FIG. 10, a first auxiliary electrode EC1 and a second auxiliary electrode EC2 are arranged in the area AR of the unit-electrode U2.

Further, the distance between the center of the first auxiliary electrode EC1 and the first electrode E1 is P1, the distance between the center of the first auxiliary electrode EC1 and the second electrode E2 is P2, the distance between the center of the second auxiliary electrode EC2 and the second electrode E2 is P3, and the distance between the center of the second auxiliary electrode EC2 and the first electrode E1 is P4. The first auxiliary electrode EC1 and the second auxiliary electrode EC2 are preferably arranged substantially symmetrically as a standard the center of the area AR.

Further, the effective value of the first voltage V1 applied to the first electrode E1 is V1E, the effective value of the second voltage V2 applied to the second electrode E2 is V2E, and the effective value of the first auxiliary voltage V3 applied to the first auxiliary electrode EC1 is V3E, and the effective value of the second auxiliary voltage V4 applied to the second auxiliary electrode EC2 is V4E, and when V2E>V1E, the effective value V3E of the voltage applied to the first auxiliary electrode EC1 is set to satisfy the above equation (1) (or set to be higher than the threshold voltage). In addition, when V1E>V2E, the effective value V4E of the voltage applied to the second auxiliary electrode EC2 is determined by using the above formula (1), P1 is replaced by P3, P2 is replaced by P4, V3E is replaced by V4E, V2E is replaced by V1E, and V1E is replaced by V2E (or set to be equal to or higher than a threshold voltage).

As described above, by setting the effective value of the voltage applied to the first auxiliary electrode EC1 and the second auxiliary electrode EC2, local stagnation of liquid crystal molecules can be improved in both convex and concave polarities. In addition, if the first voltage V1 has a lower effective value than the second voltage V2, the voltage applied to the second auxiliary electrode EC2 may be set appropriately, or no voltage may be applied. Similarly, if the voltage of the second voltage V2 has a lower effective value than the first voltage V1, the voltage applied to the first auxiliary electrode EC1 may be set appropriately, or no voltage may be applied.

Figure 11:
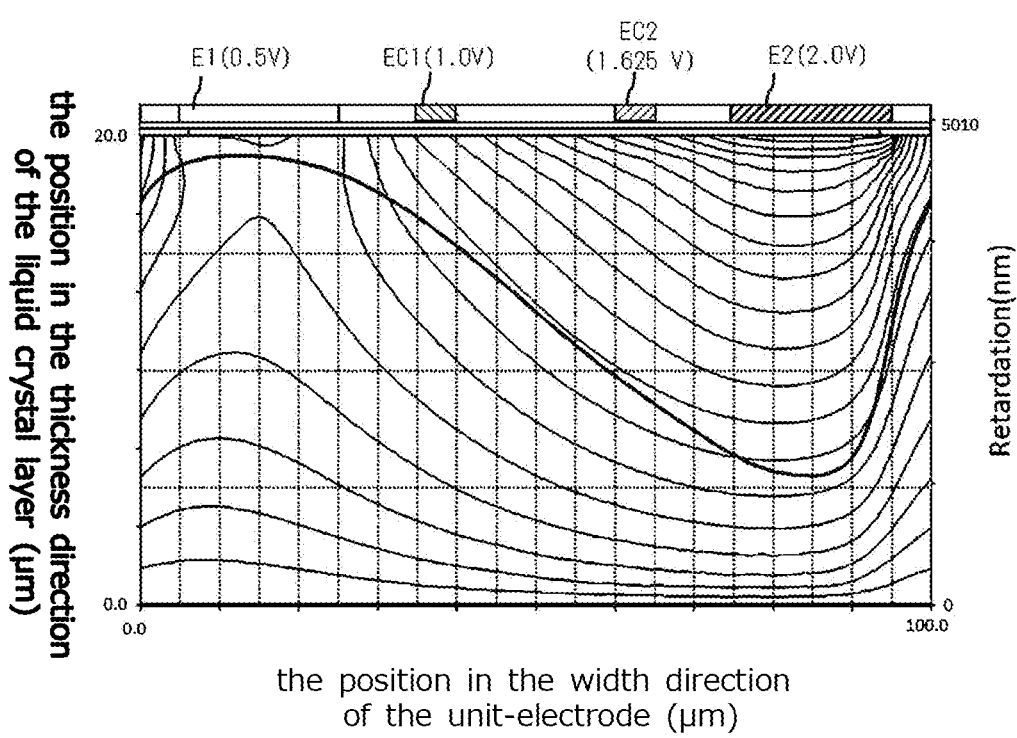
FIG. 11 is a diagram showing simulation results of potential distribution and retardation distribution in the liquid crystal layer at locations overlapping with unit-electrode having two auxiliary electrodes.

FIG. 11 is a diagram showing simulation results of potential distribution and retardation distribution caused in the liquid crystal layer at a location overlapping with the unit-electrode U2 having two auxiliary electrodes. The vertical and horizontal axes in FIG. 11 are the same as in FIG. 8A, etc., and the thick solid line indicates the retardation value corresponding to the position on the horizontal axis, and the thin solid line indicates the equipotential line in the liquid crystal layer.

The simulation conditions in FIG. 11 are that the width of the unit-electrode is 100 μm, the width of each of the first electrode E1 and the second electrode E2 is 20 μm, the width of each of the first auxiliary electrode EC1 and the second auxiliary electrode EC2 is 5 μm, and the thickness of the liquid crystal layer is 20 μm. Further, the distance between the first electrode E1 and the second electrode E2 (the width of the area AR) is 50 μm, the distance between the first electrode E1 and the first auxiliary electrode EC1 is 10 μm, the distance between the second electrode E2 and the second auxiliary electrode EC2 is 10 μm, and the distance between the first auxiliary electrode EC1 and the second auxiliary electrode EC2 is 20 μm. Further, as shown in the figure, the effective value of the first voltage V1 applied to the first electrode E1 is 0.5V, the effective value of the second voltage V2 applied to the second electrode E2 is 2.0V, the effective value of the auxiliary voltage V3 applied to the first auxiliary electrode EC1 is 1.0V, and the effective value of the auxiliary voltage V4 applied to the second auxiliary electrode EC2 is 1.625V.

In addition, the voltages in FIG. 11 can be reversed horizontally on the graph of the retardation value, by setting the effective value of the first voltage V1 applied to the first electrode E1 to 2.0V, setting the effective value of the second voltage V2 applied to the second electrode E2 to 0.5V, setting the effective value of the auxiliary voltage V3 applied to the electrode EC1 to 1.625V, and setting the effective value of the auxiliary voltage V4 applied to the second auxiliary electrode EC2 to 1.0V. Thereby, the polarity of the liquid crystal element 100 functioning as a Fresnel lens can be reversed from convex to concave.

As described above, in the liquid crystal element 100 according to the second embodiment, the unit-electrode U2 including two auxiliary electrodes (first auxiliary electrode EC1, second auxiliary electrode EC2) is arranged in an arc shape, and thereby, image quality can be improved in response to both convex and concave polarities. The liquid crystal element 100 according to the second embodiment is almost the same as the liquid crystal element 100 according to the first embodiment except for these points, and a description of this similar point will be omitted.

Third Embodiment

Next, a liquid crystal element 100 according to a third embodiment of the present invention will be described. The liquid crystal element 100 according to the third embodiment is composed of the unit-electrode U1 where no auxiliary electrode is placed, the unit-electrode U2 where one auxiliary electrode is placed (see FIG. 5), and the unit-electrode U2 where two auxiliary electrodes are placed (see FIG. 10), and this is the main difference from the liquid crystal element 100 according to the first embodiment.

In the liquid crystal element 100 according to the third embodiment, an area where a unit-electrode U1 having no auxiliary electrode is arranged, an area where a unit-electrode U2 having two auxiliary electrodes is arranged, and an area where a unit-electrode U2 having only one auxiliary electrode is arranged, are provided in order from the optical axis LA. In other words, first, as in FIG. 1B, a unit-electrode U1 having no auxiliary electrodes is arranged around the central center electrode CT, and a unit-electrode U2 having two auxiliary electrodes is arranged in an annular region (first annular region) outside of the unit-electrode U1, and a unit-electrode U2 having only one auxiliary electrode is further arranged in an annular region outside the first annular region (second annular region). In the liquid crystal element 100 according to the third embodiment, as shown in FIG. 1B and equation (3), since the width of the unit-electrode gradually decreases as it approaches the outer periphery, there is insufficient space for arranging the auxiliary electrode, so this structure is adopted.

Further, the width of the region AR in the unit-electrode U2 where only one auxiliary electrode EC is arranged is narrower than the width of the region AR in the unit-electrode U2 where two auxiliary electrodes are arranged.

As the unit-electrode U2 has only one auxiliary electrode EC, it is preferable to arrange the auxiliary electrode EC at a position approximately at the center of the area AR (or at a position where the distance is 4/5 or more of the distance between the second electrode E2 and the auxiliary electrode EC, and the distance between the second electrode E2 and the auxiliary electrode EC is 4/5 or more of the distance between the first electrode E1 and the auxiliary electrode EC), for example. With this arrangement, it is possible to increase the aperture while improving the image quality of the liquid crystal element 100 in response to both convex and concave polarities. In addition, in at least some of the unit-electrodes U2 arranged in the second annular region, the auxiliary electrodes EC may be made of a colored metal film.

Further, the voltage input to the auxiliary electrode EC of the unit-electrode U2 in the second annular region, a voltage with the same effective value as the auxiliary electrode placed on the side closer to the lower potential side of the first electrode E1and the second electrode E2 in the unit-electrode U2 in the first annular region, may be applied, and alternatively, a voltage different from the voltage applied to the two auxiliary electrodes in the unit-electrode U2 of the first annular region may be applied. Further, it is preferable that the auxiliary electrode EC of the unit-electrode U2 in the second annular region be connected to a lead wire different from the lead wire connected to the first auxiliary electrode EC1 and the second auxiliary electrode EC2 in the unit-electrode U2 in the first annular region.

The liquid crystal element 100 according to the third embodiment is substantially the same as the liquid crystal element 100 according to the first embodiment except for the points mentioned above, and a description of the similar points will be omitted.

Fourth Embodiment

Next, a liquid crystal element 100 according to a fourth embodiment of the present invention will be described. In the liquid crystal element 100 according to the fourth embodiment, the plurality of unit-electrodes in the liquid crystal element 100 is divided into several different unit-electrode groups, and includes a plurality of combinations of lead wires for input to the first electrode E1 and lead wires for input to the second electrode E2 so that inputs to different groups can be individually controlled.

Figure 12A:
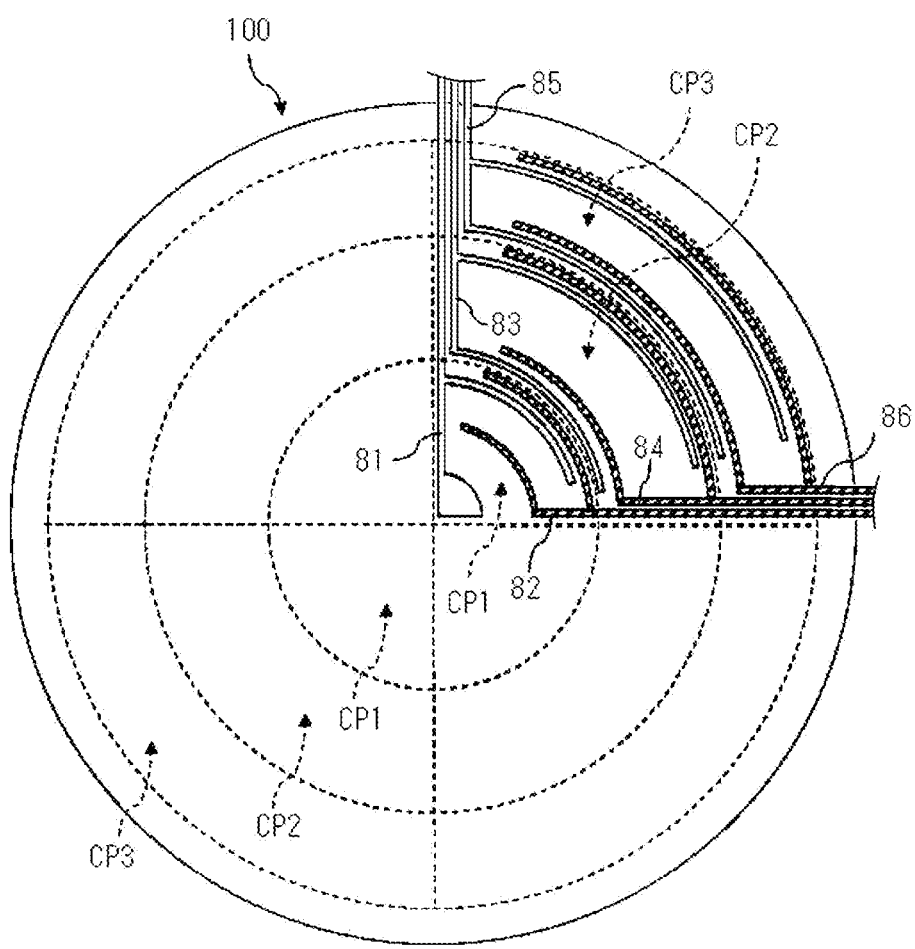
FIG. 12A is a schematic plan view for explaining the schematic configuration of a liquid crystal element in the fourth embodiment of the present invention.

FIG. 12A is a schematic plan view for explaining the schematic configuration of the liquid crystal element 100 in the fourth embodiment, and some of the configurations are omitted for convenience. As shown in the figure, the liquid crystal element 100 has a plurality of common input sections CP1, CP2, and CP3, and each of the common input sections corresponds to an area whose distance from the optical axis is within a predetermined range, and are arranged accordingly. Further, the plurality of arc-shaped unit-electrodes arranged concentrically in the liquid crystal element 100 belong to one of the common input sections, and each common input section is configured to include a group of unit-electrodes that have a common input to the first electrode E1 and a common input to the second electrode E2.

Further, the common input sections CP1, CP2, and CP3 are arranged in order closest from the optical axis LA of the liquid crystal element 100, and the common input section CP1 corresponds to a fan-shaped area with a predetermined radius centered on the optical axis LA, the common input section CP2 corresponds to an arc-shaped area adjacent to and outside the common input section CP1, and the common input section CP3 corresponds to an arc-shaped area adjacent to and outside the common input section CP2. The common input sections CP1, CP2, and CP3 correspond to regions having thickness in the radial direction of a circle centered on the optical axis LA of the liquid crystal element 100.

Moreover, the comb-teeth structure 81 in FIG. 12A is configured in a comb-tooth shape by a first electrode E1 group of a plurality of unit-electrodes belonging to the common input section CP1 and a lead wire connected to the first electrode E1 group. Similarly, the comb-tooth structure 82 is configured in a comb-tooth shape by the second electrodes E2 group of the plurality of unit-electrodes belonging to the common input section CP1 and a lead wire connected to the second electrodes E2 group. Similarly, the comb-tooth structure 83 and the comb-tooth structure 85 are also configured in a comb-tooth shape by the first electrode E1 group of unit-electrodes belonging to the common input section CP2 and the common input section CP3 and the lead wires connected to these, and the comb-tooth structure 84 and the comb-tooth structure 86 are also configured in a comb-tooth shape by the second electrode E2 group of unit-electrodes belonging to the common input section CP2 and the common input section CP3 and the lead wires connected thereto. The comb-tooth structures 81 to 86 are comb-tooth structures in which the lead wire is the trunk and the first electrode E1 and the second electrode E2 are the branches, but in FIG. 12A, the first electrode E1 and the second electrode E2 are omitted, and only a part of the first electrode E1 group and the second electrode E2 group included in the comb-tooth structures 81 to 86 are shown.

Further, as shown in FIG. 12A, the common input sections CP1, CP2, and CP3 in the fourth embodiment correspond to areas where the liquid crystal element 100 is divided into four areas with a central angle of 90 degrees. In each of the four divided areas of the liquid crystal element 100, comb-tooth structures 81 to 86 are similarly arranged, and different inputs are input from a control section (not shown) of the liquid crystal element 100 to the common input sections CP1, CP2, and CP3.

In addition, it is preferable that the input to the common input sections CP1, CP2, and CP3 be the same in each of the four divided areas, but this is not necessarily limited.

In addition, as for the input to the plurality of common input sections of the liquid crystal element 100, it is preferable that the voltage applied to the liquid crystal layer from both ends of the area AR of the unit-electrode becomes a high frequency as the position becomes farther from the optical axis LA. In the liquid crystal element 100, the width of the unit-electrode and the width of the area AR become narrower as the distance becomes farther from the optical axis LA and approaches the outer periphery of the liquid crystal element 100, however, for the unit-electrodes with narrow unit-electrode widths or area widths, the refractive index gradient tends to be easier to improve when the input voltage to the first electrode E1 and the second electrode E2 is set to a high frequency. Therefore, by the input to the unit-electrode group belonging to the common input section disposed on the outside being controlled to a higher frequency than the input to the unit-electrode group belonging to the common input section disposed on the inner side (the input to the first electrode E1 group of the outer common input section is higher frequency than the input to the first electrode group of the inner common input section, and the input to the second electrode E2 group of the outer common input section is higher frequency than the input to the second electrode E2, or input to the electrode group to which the voltage with the larger effective value is input between the first electrode E1 group and second electrode group E2 is made to have a higher frequency at the outer common input section than at the inner common input section), the image quality of the liquid crystal element 100 can be improved.

Furthermore, as for the input to the plurality of common input sections of the liquid crystal element 100, it is preferable that the voltage difference applied to the liquid crystal layer from both ends of the area AR of the unit-electrode increases as the position becomes farther from the optical axis LA. Specifically, the difference between the effective values of the input voltages from the first electrode group and the second electrode group is larger at the outer common input section than at the inner common input section. In the liquid crystal element 100, the width of the unit-electrode and the width of the area AR tend to become narrower as the distance from the optical axis LA approaches the outer periphery of the liquid crystal element 100, and as the width becomes narrower, it becomes difficult to achieve the desired refractive index gradient. As described above, by making the difference in the effective value of the input voltage to both ends of the area AR of the unit-electrode group different between the inner common input section and the outer common input section, the focal length of the inner common input section and the focal length of the outer common input section can be easily matched, and thereby the image quality of the liquid crystal element 100 can be improved. In addition, the image quality of the liquid crystal element 100 can be further improved by configuring it to the plurality of common input sections, and the voltage applied to the liquid crystal layer from both ends of the area AR of the unit-electrode (or one end on the high potential side) becomes higher in frequency as the position becomes farther from the optical axis LA, and increasing the difference in the effective value of the input voltage applied to both ends of the area AR.

Further, in the liquid crystal element 100 of the fourth embodiment, the unit-electrode U2 (see FIG. 5) including the auxiliary electrode EC is arranged when the width of the region AR is 200 μm or less, as in the first embodiment, and when the width of the region AR becomes larger than 200 μm, a unit-electrode U1 without an auxiliary electrode EC is arranged. Specifically, in the common input section CP1, the unit-electrode group is composed of only the unit-electrode U1 without the auxiliary electrode EC, and in the common input section CP2, the unit-electrode group is composed of the unit-electrode U1 without the auxiliary electrode EC and the unit-electrode U2 with the auxiliary electrode EC, and in the common input section CP3, the unit-electrode group is composed of only the unit-electrode U2 with an auxiliary electrode EC.

Further, in the liquid crystal element 100 of the fourth embodiment, unit-electrodes U1 without auxiliary electrodes EC and unit-electrodes U2 with auxiliary electrodes EC may be arranged in a mixed manner in each of the plurality of common input sections. Alternatively, the unit-electrode group in each of the plurality of common input sections may be composed of only the unit-electrode U2 having the auxiliary electrode EC. Further, the unit-electrode group in each of the plurality of common input sections may be composed only of the unit-electrode U1 without the auxiliary electrode EC, and even in such a case, the image quality of the liquid crystal element 100 can be improved by allowing inputs to the plurality of unit-electrodes in the liquid crystal element 100 to be made in a plurality of modes.

Further, the configuration of the unit-electrode U2 in the liquid crystal element 100 of the fourth embodiment may be a unit-electrode U2 provided with two auxiliary electrodes (a first auxiliary electrode EC1 and a second auxiliary electrode EC2), or a unit-electrode U2 provided with only one auxiliary electrode EC. Furthermore, the unit-electrode group in each of the plurality of common input sections may be composed of only the unit-electrode U2 with two auxiliary electrodes, or the unit-electrode U1 without the auxiliary electrode EC, the unit-electrode U2 with only one auxiliary electrode EC, and the unit-electrode U2 with two auxiliary electrodes may be arranged in a mixed manner. In addition, when they are arranged in a mixed manner, it is preferable that the width of the area AR of the unit-electrode U2 having only one auxiliary electrode EC is narrower than the width of the area AR of the unit-electrode U2 having two auxiliary electrodes, and the former unit-electrode U2 having only one auxiliary electrode EC may be arranged approximately at the center of the area AR.

Further, in the liquid crystal element 100 of the fourth embodiment, when the unit-electrode U2 having only one auxiliary electrode EC is included, for each common input section, the input to the auxiliary electrode EC group of the unit-electrode U2 is configured to be common, and when the unit-electrode U2 having two auxiliary electrodes EC (the first auxiliary electrode EC1 and the second auxiliary electrode EC2) is included, each common input section is configured so that the inputs of the unit-electrode U2 to the auxiliary electrode EC1 group are common, and the inputs of the unit-electrode U2 to the second auxiliary electrode EC2 group are common. Also, regarding the inputs to the auxiliary electrode EC group, the first auxiliary electrode EC1 group, and the second auxiliary electrode EC2 group of the common input section, the common input section disposed on the outside is made to be a high-frequency input compared to the input to the common input section disposed on the inside.

Specifically, when a plurality of unit-electrodes U2 having only one auxiliary electrode EC is included in the common input part CP2, a comb-teeth structure constituted by the auxiliary electrode EC group of the unit-electrode U2 belonging to the common input part CP2 and lead wires connected to the auxiliary electrode EC group is arranged separately from a comb-teeth structure 83 constituted by the first electrode E1 group and the lead wires and a comb-teeth structure 84 constituted by the second electrode E2 group and the lead wires. Similarly, when a plurality of unit-electrodes U2 having two auxiliary electrodes (a first auxiliary electrode EC1 and a second auxiliary electrode EC2) are included in the common input section CP2, the comb-tooth structure constituted by the lead wires connected to the second auxiliary electrode EC1 group and a comb-tooth structure constituted by the lead wires connected to the second auxiliary electrode EC2 group are arranged separately from the comb-tooth structure 83 and the comb-tooth structure 84. Therefore, when the unit-electrode U2 having only one auxiliary electrode and the unit-electrode U2 having two auxiliary electrodes are mixed in the common input section CP2, there are five types of lead wires that are input to the common input section CP2.

The liquid crystal element 100 according to the fourth embodiment is almost the same as the liquid crystal element 100 according to the first embodiment except that it has the configuration of a plurality of common input sections as described above, and a description of the similar points will be omitted.

Modification of the Fourth Embodiment

Next, a liquid crystal element 100 according to a modification of the fourth embodiment will be described. In the fourth embodiment described above, the width of the unit-electrode becomes narrower depending on the distance from the optical axis LA of the liquid crystal element 100, as shown in equation (3), etc., however in this modified example, there is a portion where the width of the unit-electrode locally increases even when away from the optical axis LA.

Figure 12B:
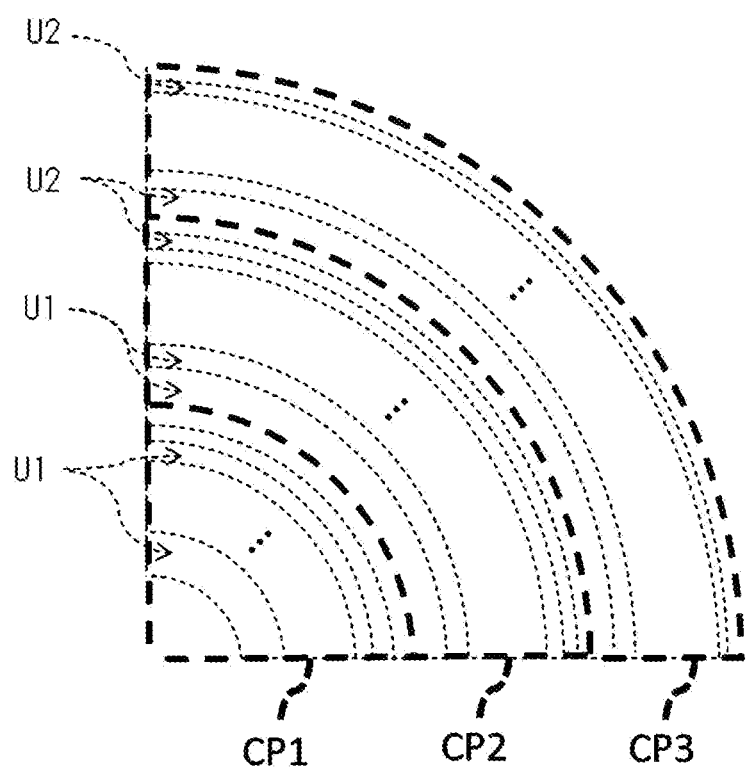
FIG. 12B is a partially enlarged a schematic plan view for explaining the schematic configuration of a liquid crystal element in a modification of the fourth embodiment.

FIG. 12B is a schematic plan view for explaining the schematic configuration of the liquid crystal element 100 in a modification of the fourth embodiment, and for convenience, some of the configurations are omitted and a plurality of common input sections CP1, CP2, and CP3 corresponding to a quarter of the liquid crystal element 100 are shown.

The liquid crystal element 100 according to the modification of the fourth embodiment has a plurality of common input sections CP1, CP2, and CP3 as in the case of FIG. 12A, and in each area to which these input sections correspond, as shown in FIG. 12B, the unit-electrode group is disposed such that the width of the unit-electrode becomes narrower as it moves away from the optical axis LA. Further, in the liquid crystal element 100 according to the present modification, the width of the unit-electrode located closest to the optical axis LA of the common input section CP2 (unit-electrode disposed at the innermost circumference) is larger than the width of the unit-electrode located at the farthest position from the optical axis LA (the unit-electrode disposed at the outermost circumference). Further, the width of the unit-electrode disposed at the position closest to the optical axis LA of the common input section CP3 is larger than the width of the unit-electrode disposed at the position furthest from the optical axis LA of the common input section CP2.

Therefore, in the liquid crystal element 100 of this modification, in two adjacent common input sections, the width of the unit-electrode disposed at the innermost periphery of the common input section disposed on the far side from the optical axis LA (or the width of several unit-electrodes arranged in series from the innermost circumference to the side away from the optical axis LA) is wider than the width of the unit-electrode disposed at the outermost periphery of the common input section disposed on the nearer side from the optical axis LA (or the width of several unit-electrodes arranged in series from the outermost circumference to the side closer to the optical axis LA). In the liquid crystal element 100 of this modification, the overall width of the unit-electrode tends to become narrower as it moves away from the optical axis LA in the radial direction, but when the corresponding range of the common input section is switched, the width of the unit-electrode becomes wider without following this trend.

From another point of view, in each of two adjacent common input sections, a narrower unit-electrode is disposed in a portion farther from the optical axis LA (a portion on the outer periphery side) than a portion closer to the optical axis LA (a portion on the optical axis side or an inner periphery side), that is, the arrangement density (arrangement density per unit length in the radial direction) of unit-electrodes in the inner circumference side portion of the common input section disposed on the side far from the optical axis LA is less than on the outer circumference side portion of the common input section disposed on the side close to the optical axis LA. That is, in the liquid crystal element 100 of this modification, at the boundary between two adjacent common input sections, sparseness and denseness occur in the arrangement density of the unit-electrodes, and portions where the arrangement density is sparse (portion at the optical axis side or inner peripheral side of the common input section) and portions where the arrangement density is dense (portion on the outer circumferential side of the common input section) are alternately arranged.

In addition, in the liquid crystal element 100 of this modification, as in the case of the liquid crystal element 100 of the fourth embodiment described above, as the plurality of common input sections are arranged on the outside, the input to the unit-electrode group belonging to the common input section is made to have a high frequency (for example, as the plurality of common input sections are arranged on the outer side, the input on the high potential side of the first electrode group and the second electrode group are made to have a high frequency).

Further, as in the fourth embodiment described above, the difference in the effective value of the input voltage from the first electrode group and the second electrode group is made larger at the outer common input section than at the inner common input section. Therefore, among the three common input sections, the difference in the input frequency and effective value of the input voltage to the common input section CP3 is the largest, and the difference in the input frequency etc. to the common input section CP1 is the smallest. The image quality of the liquid crystal element 100 can be improved by doing the following: setting the input frequency, etc. to the unit-electrode group (the first electrode group, the second electrode group, and the auxiliary electrode group in the unit-electrode group) in each common input section to make it easier to improve the refraction index gradient of the outer circumference side of the common input section, and adjusting the width of the unit-electrode on the inner circumferential side as shown in FIG. 12B to match this input frequency etc. (adjust so that the arrangement density is sparse).

Further, in the liquid crystal element 100 of this modification, as shown in FIG. 12B, a unit-electrode U1 having no auxiliary electrode and a unit-electrode U2 having one or two auxiliary electrodes are arranged.

Although the liquid crystal element 100 of the modification of the fourth embodiment has been described above, the points not explained are substantially the same as the liquid crystal element 100 of the fourth embodiment, and explanations of the points that are substantially the same will be omitted.

In addition, in the fourth embodiment and its modifications, it is desirable that the frequencies of the input voltages to the first electrode E1 group, the second electrode E2 group, and the auxiliary electrode group be the same in the unit-electrode groups in each of the common input sections, however it is not necessarily limited to these embodiments.

Further, in the fourth embodiment and the like, the circumferential direction of the liquid crystal element 100 is divided into four, and further the common input section is provided, and divided into three parts according to the distance from the optical axis LA, but the common input section is not limited to this type, and it may be divided into two or more parts depending on the distance from the optical axis LA. Further, the common input section may be divided into five or more or three or less in the circumferential direction, or may be provided in a circular or annular region without being divided.

Fifth Embodiment

Next, a liquid crystal element 100 according to a fifth embodiment of the present invention will be described. The liquid crystal element 100 according to the fifth embodiment includes a plurality of unit-electrodes U1 and U2 like the first embodiment shown in FIG. 1B, but the main difference from the liquid crystal element 100 of the first embodiment is that it has a transmitted light restriction section that blocks at least a portion of transmitted light in an area different from the area AR.

Figure 13:
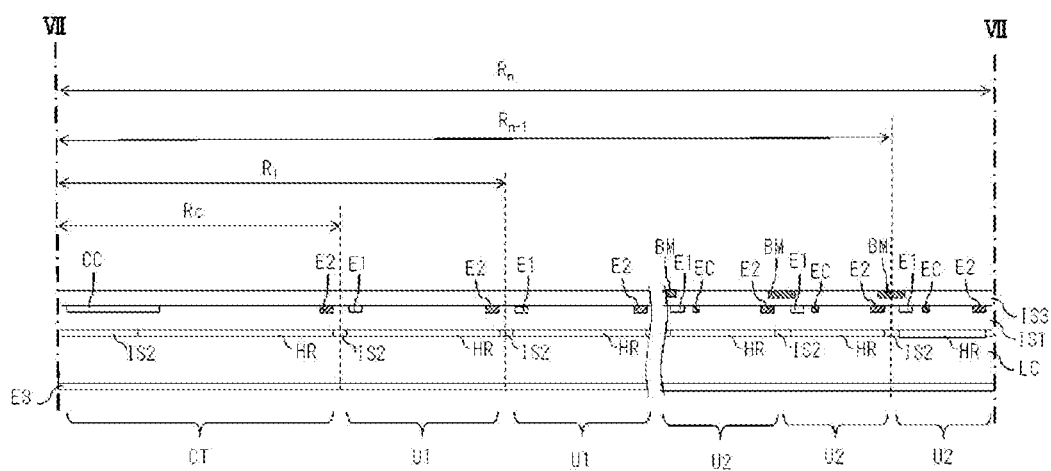
FIG. 13 is a schematic cross-sectional view showing a radial cross section passing near the optical axis of a liquid crystal element 100 according to a fifth embodiment of the present invention.

FIG. 13 is a schematic cross-sectional view showing a radial cross section passing near the optical axis of a liquid crystal element 100 according to a fifth embodiment of the present invention, and corresponds to the position of the VII-VII cross section in FIG. 1B.

As shown in FIG. 13, equation (3), etc., as in the case of the first embodiment, the liquid crystal element 100 of the fifth embodiment is configured to include a plurality of unit-electrodes in which the width of the unit-electrode U1 and U2 becomes narrower as the distance from the optical axis LA of the liquid crystal element 100 increases. Further, the transmitted light restricting section of the fifth embodiment includes a shielding layer BM and an insulating layer IS3, and after the transmitted light restricting section is laminated on a glass substrate GA (not shown), the structure of the first electrode E1, resistance layer HR, etc., are sequentially laminated. In addition, the transmitted light restricting section may be constituted by an independent member different from the transparent substrate B1 and the transparent substrate B2, or may be formed on a different substrate from the glass substrate on which the first electrode E1 and the like are formed, and may be arranged on either side of the liquid crystal layer LC.

The shielding layer BM is composed of, for example, a laminated film of metallic chromium or chromium oxide, but may also be composed of a low-reflection light-shielding resin. The insulating layer IS3 is made of silicon dioxide, for example, and is laminated so as to bury the shielding layer BM. In addition, the shielding layer BM of the transmitted light restricting section may be configured so that a part of the transmitted light is shielded by a semi-transparent material, and the transmitted light through the boundary portion where the shielding layer BM is arranged is suppressed more than the transmitted light through the area AR.

Further, the shielding layer BM is arranged at the boundary between two adjacent unit-electrodes, as shown in FIG. 13. As shown in the figure, the shielding layer BM is arranged so as to overlap the insulating layer IS1 interposed between the two unit-electrodes, and also it extends so as to overlap at least a portion of the first electrode E1 and at least a portion of the second electrode E2.

By arranging such a shielding layer BM, a refractive index gradient occurs in the opposite direction to the refractive index gradient that occurs dominantly in the area AR, reducing the transmitted light in the portion where the refractive index changes sharply, and thereby the image quality of the liquid crystal element 100 can be improved.

Further, the transmitted light restricting portion of this embodiment is configured by, for example, arranging a shielding layer BM at the boundary between unit-electrodes where the width of the area AR is 200 μm or less. As shown in FIG. 13, equation (3), etc., when the width of the unit-electrode becomes narrower depending on the distance from the optical axis LA of the liquid crystal element 100, by arranging the width of the unit-electrode so that the ratio of the width of the shielding layer BM to the total width of the two unit-electrodes that the shielding layer BM spans gradually increases as it moves away from the optical axis LA of the liquid crystal element 100, the image quality can be improved when the aperture is increased. In other words, by arranging them so that (the width of the shielding layer BM)/(the total value of the widths of the two unit-electrodes that the shielding layer BM straddles) gradually increases as the distance from the optical axis LA of the liquid crystal element 100 increases, the image quality can be improved when increasing aperture.

Further, the shielding layer BM is arranged at the boundary between two unit-electrodes when the width of the two unit-electrodes adjacent to each other is less than a predetermined value, and if the width of one of the two unit-electrodes adjacent to each other is larger than the predetermined value, it may not be arranged. This ensures brightness in the area close to the optical axis LA of the liquid crystal element 100, and improves image quality in the area far from the optical axis LA.

Figure 14A:
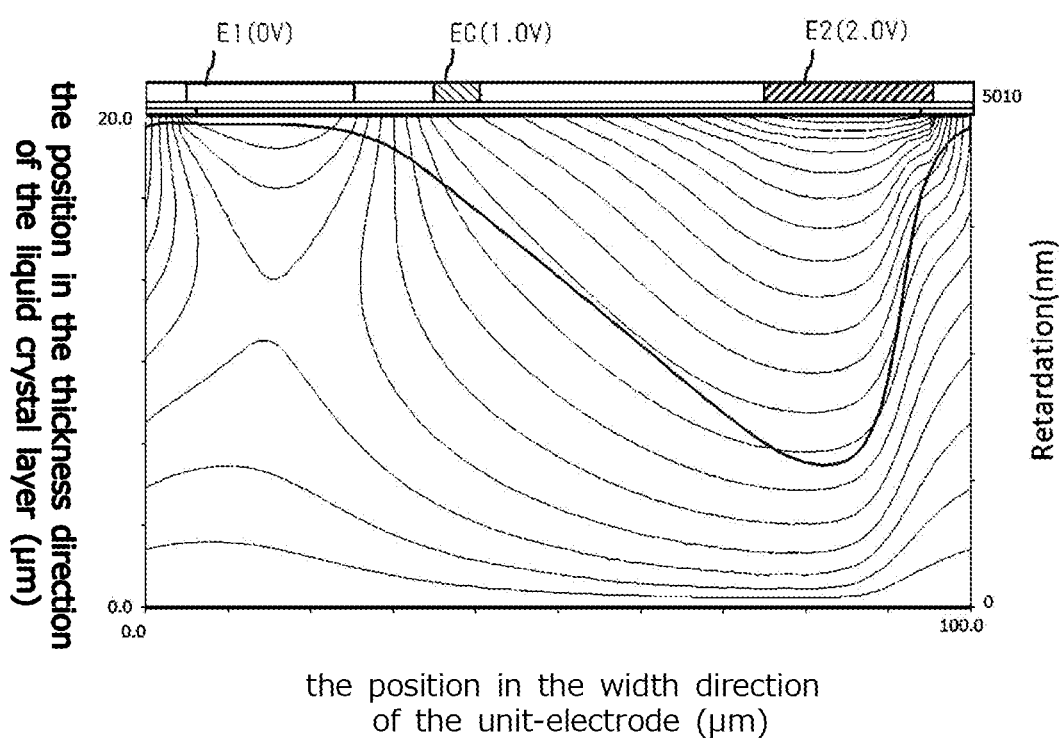
FIG. 14A is a diagram showing simulation results of potential distribution and retardation distribution in the liquid crystal layer at locations overlapping with unit-electrodes having one auxiliary electrode.
Figure 14B:
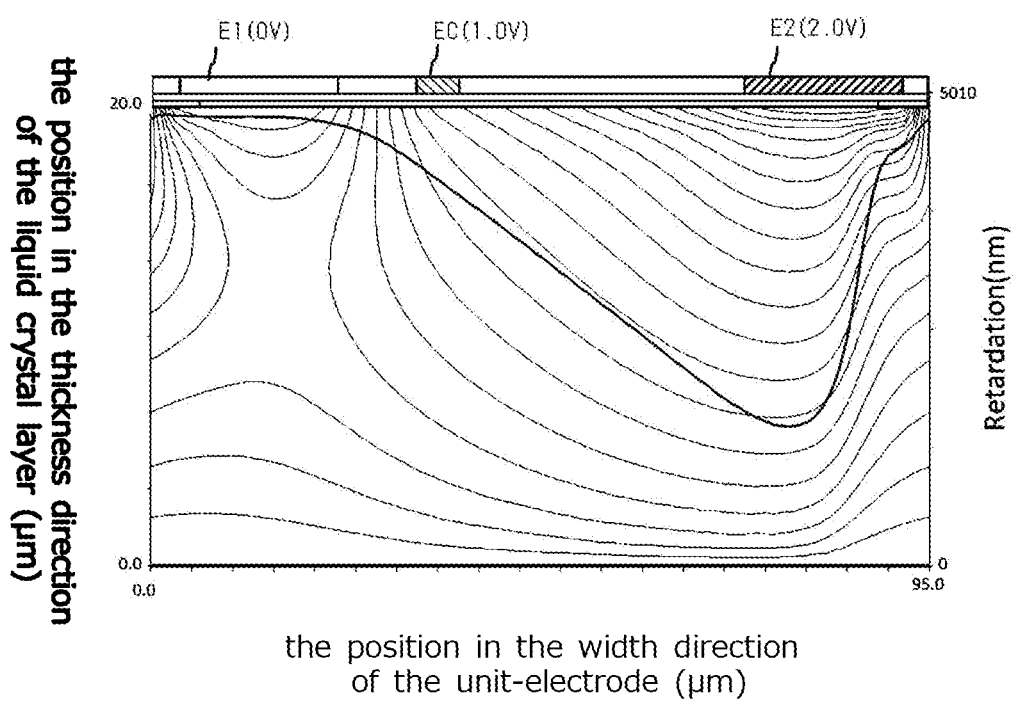
FIG. 14B is a diagram showing simulation results of potential distribution and retardation distribution in the liquid crystal layer at locations overlapping with unit-electrodes having one auxiliary electrode.

FIG. 14A and FIG. 14B are diagrams showing simulation results of potential distribution and retardation distribution caused in the liquid crystal layer at a location overlapping with the unit-electrode U2 having one auxiliary electrode EC. The vertical and horizontal axes in FIG. 14A and FIG. 14B are the same as in FIG. 8A, etc., and the thick solid lines are retardation values corresponding to the positions on the horizontal axis, and the thin solid lines are equipotential lines in the liquid crystal layer.

The simulation conditions in FIG. 14A are that the width of the unit-electrode U2 is 100 μm, the width of each of the first electrode E1 and the second electrode E2 is 20 μm, the width of the auxiliary electrode EC is 5 μm, and the thickness of the liquid crystal layer is 20 μm. Further, the distance between the first electrode E1 and the second electrode E2 (the width of the area AR) is 50 μm, the distance between the first electrode E1 and the auxiliary electrode EC is 10 μm, and the distance between the auxiliary electrode EC and the second electrode E2 is 35 μm. Further, as shown in the figure, the effective value of the first voltage V1 applied to the first electrode E1 is 0V, the effective value of the second voltage V2 applied to the second electrode E2 is 2.0V, and the effective value of the auxiliary voltage V3 applied to the auxiliary electrode EC is 1.0V.

FIG. 14B differs from FIG. 14A in the width of the unit-electrode, and the width of the unit-electrode is 95 μm. The simulation conditions in FIG. 14B are the same as in FIG. 14A except for this point. That is, in FIG. 14B, the width of the insulating layer IS1 interposed at the boundary between adjacent unit-electrodes is narrower than in the case of FIG. 14A, and therefore a slight distortion occurs in the equipotential lines and retardation distribution of the portion overlapping with the second electrode E2. Furthermore, as shown in FIG. 14A and FIG. 14B, in the portion overlapping with the first electrode E1, the gradient of refractive index (gradient of retardation) that was dominant in the area AR disappears, and the gradient becomes almost zero, and in the portion overlapping with the second electrodes E2, in order to create a height difference in the refractive index gradient of the area AR, a steep refractive index gradient is generated in the opposite direction to the refractive index gradient of the region AR. Also, a portion intervening between the first electrode E1 and the second electrode E2 in another adjacent unit-electrode (a portion intervening between the second electrode E2 and the first electrode E1 in another adjacent unit-electrode), similar to the portion overlapping with the second electrode E2, generates a refractive index gradient in the opposite direction to the refractive index gradient in the area AR. Further, a portion where the refractive index gradient is almost zero, such as a portion overlapping with the first electrode E1 in FIG. 14A and FIG. 14B, is a portion that does not contribute to image formation in the region AR because it has poor lens function. Furthermore, a portion where a refractive index gradient occurs in the opposite direction to the refractive index gradient in the region AR is also a portion that does not contribute to image formation in the region AR. By restricting the transmitted light at the boundary between two adjacent unit-electrodes, by the transmitted light limiting section of the fifth embodiment, at least a portion of the transmitted light that does not contribute to the imaging of the area AR is eliminated, so that the image quality of the liquid crystal element 100 becomes clearer.

By providing the transmitted light limiting section, it is possible to arrange the auxiliary electrode EC with emphasis on improvement of the refractive index distribution in the region AR while allowing deterioration of the refractive index distribution at the boundary with other unit-electrodes, and therefore, by combining the transmitted light limiting section and the auxiliary electrode EC, it is possible to further improve image quality. However, the transmitted light limiting section may be provided in a liquid crystal element constituted only by the unit-electrode U1 without the auxiliary electrode EC, and even in such a case, it is expected that the image quality of the liquid crystal element will be improved.

The liquid crystal element 100 of the fifth embodiment is almost the same as the liquid crystal element 100 of the first embodiment except that it includes the transmitted light restricting section as described above, and a description of the similar points will be omitted.

Sixth Embodiment

Next, a sixth embodiment of the present invention will be described. Although the liquid crystal element 100 of the sixth embodiment includes a plurality of unit-electrodes U1 and U2 like the first embodiment shown in FIG. 1B, the main difference is that an insulating wall WL is disposed at the boundary between the unit-electrodes.

Figure 15A:
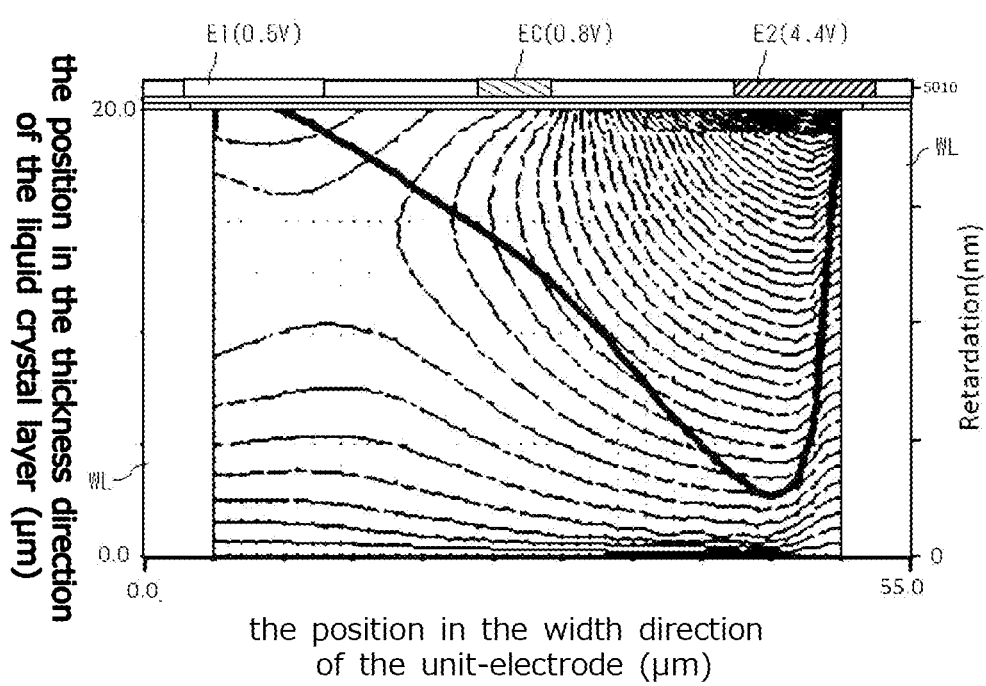
FIG. 15A is a diagram showing the structure of a unit-electrode according to the sixth embodiment of the present invention, and simulation results of potential distribution and retardation distribution.
Figure 15B:
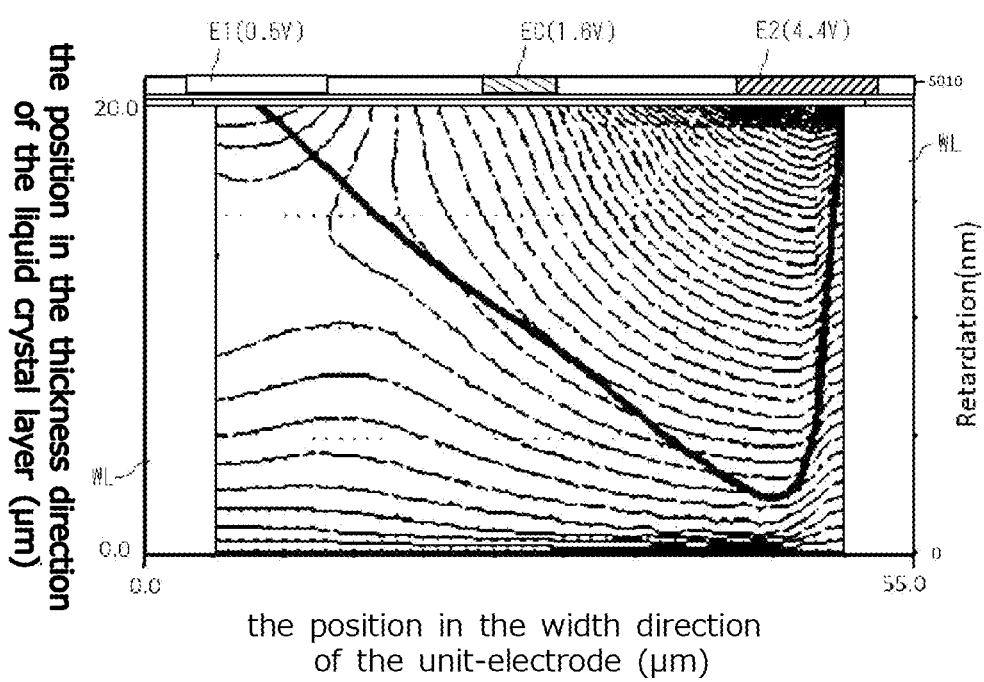
FIG. 15B is a diagram showing the structure of a unit-electrode according to the sixth embodiment of the present invention, and simulation results of potential distribution and retardation distribution.
Figure 15C:
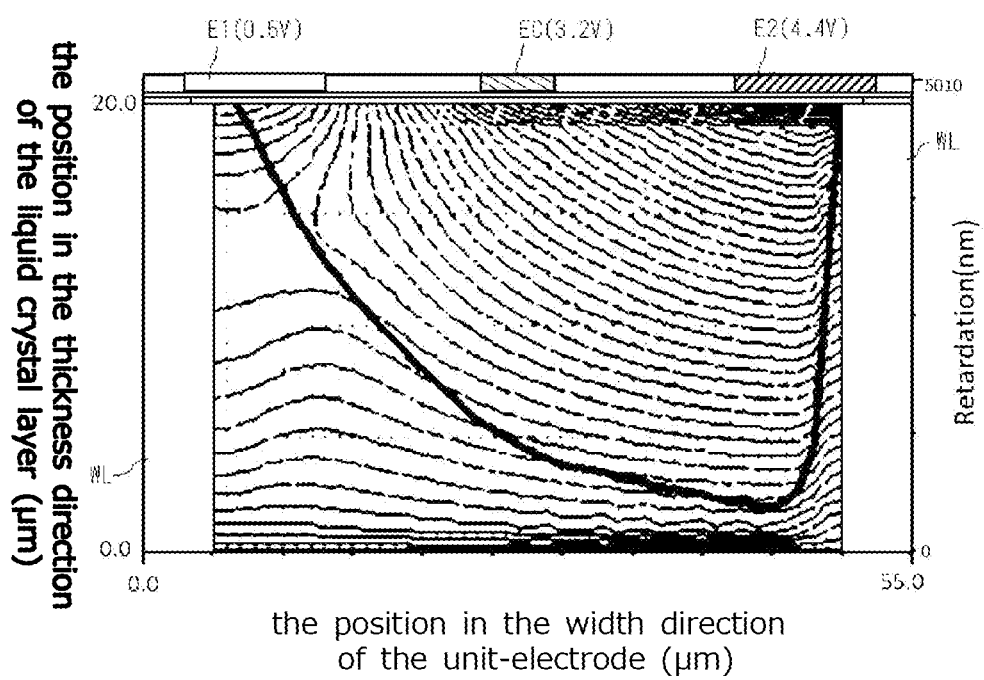
FIG. 15C is a diagram showing the structure of a unit-electrode according to the sixth embodiment of the present invention, and simulation results of potential distribution and retardation distribution.
Figure 15D:
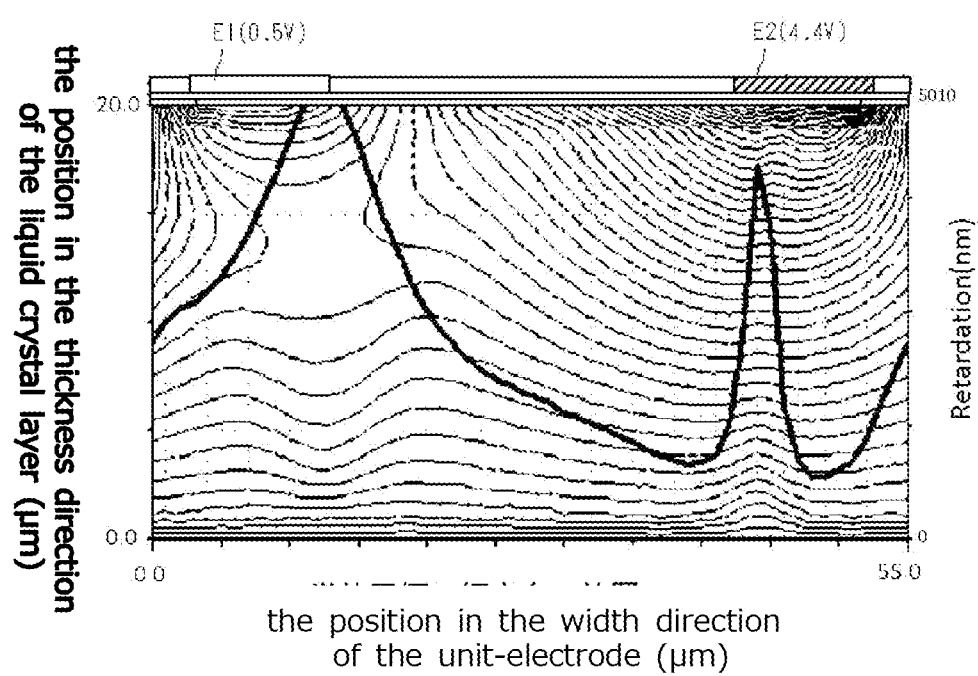
FIG. 15D is a diagram showing simulation results of potential distribution and retardation distribution in the case where the auxiliary electrode and the wall are not present.

FIGS. 15A to 15C are diagrams showing the structure of the unit-electrode U2 of the sixth embodiment and simulation results of the potential distribution and retardation distribution in the liquid crystal layer, similar to FIG. 8A. Further, FIG. 15D is a diagram for comparison with FIGS. 15A to 15C, showing simulation results of the potential distribution and retardation distribution in the liquid crystal layer in the case where the auxiliary electrode EC and the insulating wall WL are not present. The simulation conditions in FIG. 15A, etc., are that the width of the unit-electrode U2 is 55 µm, the width of the first electrode E1 and the second electrode E2 are both 10 µm, the width of the auxiliary electrode EC is 5 µm, and the thickness of the liquid crystal layer is 20 µm. Further, the width of the region AR is 30 µm, the auxiliary electrode EC is arranged in the center thereof, the first voltage V1 is 0.5V, and the second voltage V2 is 4.4V.

The auxiliary voltage V3 in FIG. 15A to FIG. 15C is 0.8V, 1.6V, and 3.2V, respectively, and as mentioned above, FIG. 15D shows the simulation results without the insulating wall WL and auxiliary electrode EC. The insulating wall WL, which is an insulating structure, is configured so as not to shield the electric field from the first electrode E1 and the second electrode E2 of adjacent unit-electrodes, and has a width of 10 µm. For convenience of notation, the retardation curves are omitted for the upper left part and inside the insulating wall WL in each figure, but the retardation value in the upper left part in FIG. 15A to FIG. 15C increases until it reaches the edge of the insulating wall WL, and becomes almost zero within the insulating wall WL. In addition, the notation of the equipotential lines is also omitted in the insulating wall WL.

As shown in FIG. 15A to FIG. 15C, in the sixth embodiment, the insulating wall WL is arranged astride two adjacent unit-electrodes U2, and partially overlaps with the first electrode E1 and the second electrode E2. With such structure, the insulating wall WL, which is an insulating structure, restricts the movement of the liquid crystal material, and it is thought that the controllability of the refractive index gradient by the auxiliary electrode EC is improved. In other words, the insulating wall WL improves the controllability of the refractive index gradient within the unit-electrode U2 by the auxiliary electrode EC, making it easier to obtain an improved refractive index distribution.

Further, as shown in FIG. 15B, when the auxiliary voltage V3 is set to 1.6 V, the slope of the retardation curve becomes almost linear, which is often suitable for improving the image quality of the liquid crystal element 100. In some cases, the image quality can be improved by appropriately adjusting the auxiliary voltage V3, for example, between 0.8 V and 3.2 V, and by making the slope of the retardation curve a slope with curvature.

The insulating wall WL can be formed, for example, by adding an ultraviolet curing resin into the liquid crystal material constituting the liquid crystal layer LC in advance, and irradiating the boundary portion between the unit-electrodes U1 and U2 with ultraviolet light after the liquid crystal material is encapsulated. Specifically, a liquid crystal material mixed with a solution of a photocurable liquid crystal monomer is sealed, and polymers are selectively precipitated and hardened by pattern exposure to ultraviolet rays. However, the insulating wall WL is not limited to this embodiment, and may be formed using other methods. Furthermore, the insulating wall WL does not need to have a height equivalent to the thickness of the liquid crystal layer and completely block the movement of the liquid crystal material, and it may have a wall-like structure with a height lower than the thickness of the liquid crystal layer.

The liquid crystal element 100 of the sixth embodiment is almost the same as the liquid crystal element 100 of the first embodiment except that it includes the wall portion WL as described above, and a description of this similar point will be omitted.

Seventh Embodiment

Figure 16:
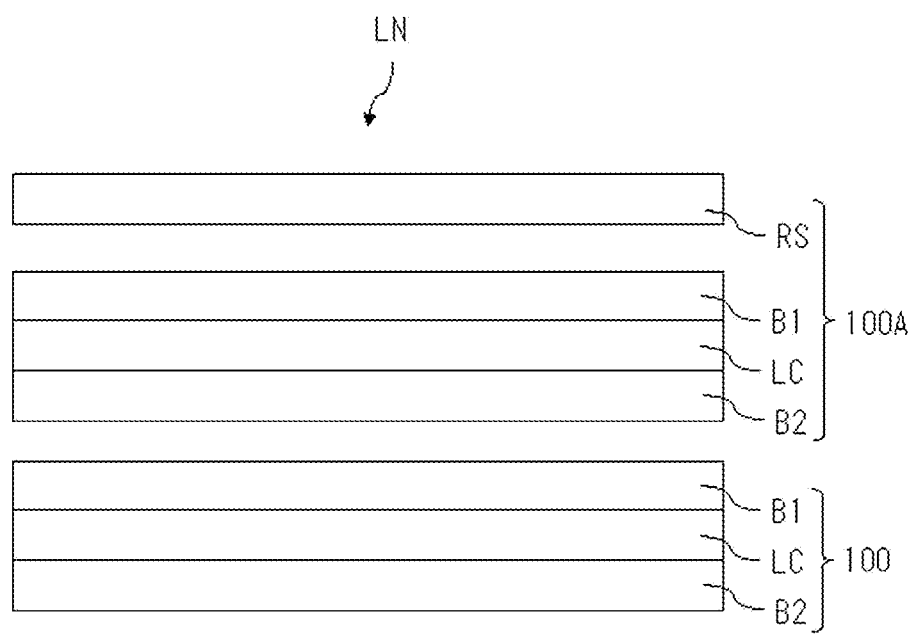
FIG. 16 is a schematic diagram for explaining the schematic configuration of a liquid crystal unit according to the seventh embodiment of the present invention.
Figure 17:
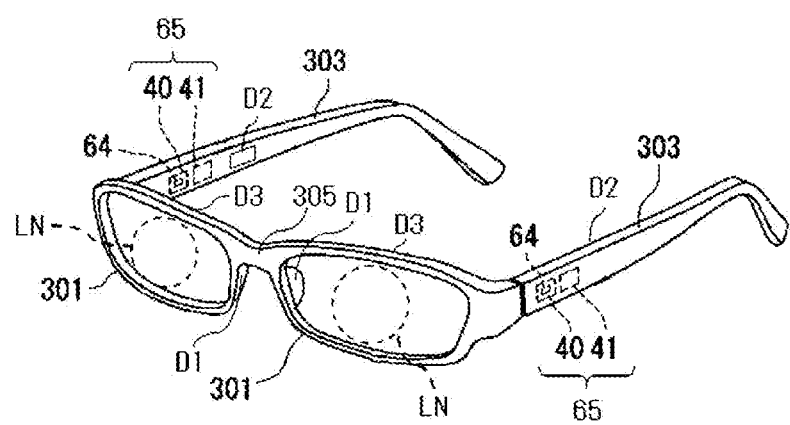
FIG. 17 is a schematic diagram for explaining the schematic configuration of eyeglasses to which a liquid crystal unit according to the seventh embodiment of the present invention is applied.

Next, a seventh embodiment of the present invention will be described. FIG. 16 is a schematic diagram for explaining the schematic configuration of a liquid crystal unit LN according to the seventh embodiment, and FIG. 17 is a schematic diagram for explaining the schematic configuration of eyeglasses 200 to which the liquid crystal unit LN according to the seventh embodiment is applied. The glasses 200 have a liquid crystal unit LN, so that the power can be changed.

As shown in FIG. 16, the liquid crystal unit LN includes a liquid crystal element 100 and a liquid crystal element 100A including a transmitted light restriction section RS. The liquid crystal element 100A and the liquid crystal element 100 in FIG. 16 differ in the presence or absence of the transmitted light restricting part RS and the alignment direction of the alignment film of the liquid crystal layer LC, but otherwise have the same configuration. Further, the liquid crystal element 100 of the liquid crystal unit LN has the same configuration as the liquid crystal element 100 of the second embodiment, except that the liquid crystal element 100A includes a transmitted light restriction section RS. Furthermore, in the liquid crystal element 100A and the liquid crystal element 100 in FIG. 16, the alignment directions of liquid crystal molecules are orthogonal to each other by the alignment film in the liquid crystal layer LC being orthogonal to each other. In addition, as the liquid crystal unit LN, two liquid crystal elements 100 of the first embodiment may be stacked to provide the transmitted light restricting section RS, or two liquid crystal elements 100 of other embodiments may be stacked to provide the transmitted light restricting section RS.

The liquid crystal elements 100 and 100A each function as a Fresnel lens, and are arranged overlappingly so that the optical axes and the positions of the unit-electrodes coincide. The transmitted light restriction section RS restricts the light transmitted through the boundary portion of the adjacent unit-electrodes of the liquid crystal elements 100 and 100A.

Furthermore, the transmitted light restricting section RS in the liquid crystal unit LN of the seventh embodiment is a liquid crystal module that can control the amount of transmitted light for each of a plurality of pixel regions and can function for each pixel region as an optical shutter. The transmitted light restricting section RS is configured to control the area in which transmitted light is restricted based on the voltage input to the unit-electrodes of the liquid crystal elements 100 and 100A, and the restricted area of transmitted light may be changed depending on the polarity such as a convex shape or a concave shape, and the restricted area of transmitted light may be controlled to be increased or decreased depending on the power of the glasses 200.

Glasses 200 in FIG. 17 include a pair of control sections 65, a pair of liquid crystal units LN, a pair of rims 301, a pair of temples 303, and a bridge 305. The control unit 65 includes a controller 40 and a power supply circuit 41, and the controller 40 further includes a communication device 64. A pair of rims 301 hold a lens having a liquid crystal unit LN. The glasses 200 also include an eye detection unit that acquires information regarding eye movement. The eye detection section includes an electrooculography sensor D1 included in a pair of nose pads, an electrooculography sensor D2 disposed on the temple part of the temple 303 facing the wearer, and an electrooculography sensor D2 located on the upper part of the pair of rims 301. Additionally, an eye detection sensor D3 that detects eye movements of the wearer is included.

The electrooculography sensors D1 and D2 measure the electrooculography in each of the eyes to detect eye movements of the wearer. The electrodes included in the electrooculography sensors D1 and D2 come into contact with the skin of the wearer to detect the electrooculography at the center of the left and right eyes and at the temples. The eye detection sensor D3 may include, for example, a light source such as an LED (Light Emitting Diode) and an imaging unit such as a camera. As the eye tracking technique is applied to the glasses 200, for example, a non-contact type such as a corneal reflex method, a dark pupil method, or a bright pupil method may be adopted, or a contact type such as electrooculography method may be adopted, and both non-contact types and contact types may be adopted, but the types are not limited to these.

The glasses 200 may be configured to change the power in the liquid crystal units 100A, 100 based on information regarding eye movements detected from the electrooculography sensors D1, D2 and the eye detection sensor D3, or the transmitted light restriction area may be controlled by the transmitted light restriction section RS. Furthermore, as the eye detection section in the glasses 200, an electrooculography sensor or an eye detection sensor may be placed at another location.

Although the glasses 200 of the seventh embodiment have been described above, the liquid crystal unit LN of the glasses 200 may use, for example, the liquid crystal element 100 of the fifth embodiment instead of the liquid crystal element 100A.

In addition, although the glasses 200 of the seventh embodiment have the transmitted light restricting section RS, the present invention is not necessarily limited to such an aspect. Therefore, glasses may be constructed by, for example, stacking two liquid crystal elements 100 in any of the first to fifth embodiments. Further, the glasses equipped with the liquid crystal element 100 according to any of the first to fifth embodiments or the glasses 200 according to the sixth embodiment may be glasses having a frame structure as shown in FIG. 17, or may be goggle type glasses. Furthermore, the liquid crystal element 100 of the first embodiment etc., may be used in XR (Extended Reality) glass type devices such as AR (Augmented Reality)/VR (Virtual Reality)/MR (Mixed Reality), or contact lenses. Furthermore, the glasses equipped with the liquid crystal element 100 of the first embodiment may be AR glasses, AR goggles, or smart glasses that have the function of displaying digital information superimposed on the real world, or VR goggles, VR glasses, VR headsets, or VR head-mounted displays that have the function of providing virtual reality to the user. Further, the glasses, which are these XR glasses-type devices, may have either a see-through display, a video see-through display that covers the wearer's eyes, or an immersive display.

In addition, the liquid crystal element 100 provided with a plurality of common input sections according to the fourth embodiment or a modification thereof may be configured to include a transmitted light restriction section RS. In addition, the transmitted light restricting section RS of the fifth embodiment is not limited to the above-described aspect, and may be arranged, for example, on the transparent substrate B2 provided with the counter electrode E3, or it may be arranged at a position closer to the liquid crystal layer LC than the first electrode E1 or the second electrode E2. Further, the transmitted light restricting section RS of the sixth embodiment may be arranged on the wearer's side of the glasses 200 or on the opposite side, and may be arranged between the two liquid crystal layers LC in the liquid crystal unit LN.

In addition, in the above-mentioned first embodiment, etc., the unit-electrodes U1 and U2 have an arcuate shape where the circumference is divided into four and the center angle is 90 degrees, as shown in FIG. 1B, however, the present invention is not limited to such aspect. The unit-electrodes U1 and U2 may have an annular shape of 360 degrees or approximately 360 degrees, or may have an arc shape with a central angle of 180 degrees, 60 degrees, 45 degrees, etc. Furthermore, the liquid crystal element 100 may have a mixture of arcuate shapes with different center angles.

In addition, in the liquid crystal element 100 of the first embodiment, a unit-electrode U2 including one auxiliary electrode EC is arranged, and in the liquid crystal element 100 of the second embodiment, a unit-electrode U2 is provided with a first auxiliary electrode EC1 and a second auxiliary electrode EC2 is arranged, but in the liquid crystal element 100, unit-electrodes U2 having different numbers of auxiliary electrodes may be arranged in a mixed manner.

Further, although the auxiliary voltage input to the auxiliary electrode EC, the first auxiliary electrode EC1, and the second auxiliary electrode EC2 in the first embodiment and the second embodiment is a rectangular wave voltage having the same frequency and phase as the first voltage V1 and the second voltage V2, it is not necessarily limited to this aspect. Therefore, for example, the frequency of the auxiliary voltage may be set higher or lower than the frequencies of the first voltage V1 and the second voltage V2. Moreover, when the frequencies of the first voltage V1 and the second voltage V2 are different, the frequency of the auxiliary voltage may be set to be between the frequencies of the first voltage V1 and the second voltage V2.

In addition, the configuration of the unit-electrodes in the first embodiment and the like is not necessarily limited. Therefore, for example, in the first embodiment and the like, the first electrode E1, the second electrode E2, the auxiliary electrode EC, the first auxiliary electrode EC1, and the second auxiliary electrode EC2 are formed on the same level, but they are not limited to such an aspect, and may be formed on different levels. Further, the first electrode E1, the second electrode E2, the auxiliary electrode EC, the first auxiliary electrode EC1, and the second auxiliary electrode EC2 may be formed in contact with the resistance layer HR without intervening the insulating layer IS1 between them, or may be arranged closer to the liquid crystal layer LC than the resistance layer HR. Further, it is preferable that the distance from the auxiliary electrode EC, the first auxiliary electrode EC1, and the second auxiliary electrode EC2 to the liquid crystal layer LC is less than or equal to the distance from at least one of the first electrode E1 and the second electrode E2 to the liquid crystal layer LC. Further, for example, when the auxiliary electrode EC, the first auxiliary electrode EC1, and the second auxiliary electrode EC2 are formed in a linear shape with a narrower line width than the first electrode E1 and the second electrode E2, by making sure that the distance to the liquid crystal layer LC is not larger than at least one (or both) of the first electrode E1 and the second electrode E2, the voltage applied to the auxiliary electrode EC etc. is less likely to be attenuated, making it easier to control the potential gradient.

In addition, in the liquid crystal element 100 of the first embodiment etc. that has the unit-electrodes U1 and U2 concentrically arranged in an arc shape and has a function as a Fresnel lens, on the other hand, by continuously arranging the unit-electrode U1 and U2 in a rectangular shape, a liquid crystal element having a function as a linear Fresnel lens can be obtained. In this case, for example, the width of the unit-electrode is arranged to become narrower as the curvature of the linear Fresnel lens increases, but this is not necessarily limited. Furthermore, when applying the linear Fresnel lens to eyeglasses, two liquid crystal elements each having continuous rectangular unit-electrodes U1 and U2 are arranged so that their optical axes are perpendicular to each other, and apply as the lenses for the eyeglasses. In addition, the linear Fresnel lens may have a configuration including a plurality of common input sections as shown in FIG. 12A, or may have a configuration with unit-electrode arrangement density as shown in FIG. 12B, and the transmitted light restriction section RS may be provided.

In addition, when the wall portion WL is made of an ultraviolet curing resin as in the sixth embodiment, for example, a thin film to limit the incidence of ultraviolet rays may be formed on the liquid crystal element 100. By configuring eyeglasses equipped with the liquid crystal element 100 with a thin film that restricts the incidence light of wavelength at which the photo-curable liquid crystal monomer is cured, it is possible to reduce the deterioration of the optical performance due to the curing of the remaining photo-curable monomer.

Further, the present invention is not limited to the embodiments described above, and various modifications and combinations are possible without departing from the gist thereof. For example, the configurations described in the above embodiments can be replaced with configurations that are substantially the same, have the same effects, or can achieve the same objectives.

REFERENCE SIGNS LIST

100, 100A liquid crystal element, B1, B2 transparent substrate, LC liquid crystal layer, U1, U2 unit-electrode, CT center electrode, CC core electrode, LA optical axis, RF refractive index distribution, E1 first electrode, E2 second electrode, E3 counter electrode, 71 first lead wire, 72 second lead wire, 73 third lead wire, 75 fourth lead wire, 74, 76 lead wire connection portion, HR resistance layer, AR area, IS1, IS2, IS3, IL insulation layer, EC auxiliary electrode, 81, 82, 83, 84, 85, 86 comb structure, P1, P2, P3, P4 distance, GA glass substrate, EC1 first auxiliary electrode, EC2 second auxiliary electrode, CP1, CP2, CP3 common input section, BM shielding layer, WL insulating wall, LN liquid crystal unit, RS transmitted light restriction section, D1, D2 electrooculography sensor, D3 eye detection sensor.

The invention claimed is:

1. A liquid crystal element comprising:
 a liquid crystal layer; and
 a plurality of unit-electrodes comprising:
  a first electrode formed in a linear shape;
  a second electrode formed in a linear shape and receiving a voltage different from that of the first electrode; and
  a resistance layer having a higher electrical resistivity than the first electrode and the second electrode;
 wherein the resistance layer in each of the plurality of unit-electrodes is separated from the resistance layer in an adjacent unit-electrode and arranged in an area between the first electrode and the second electrode in a plan view,
 wherein the resistance layer in each of the plurality of unit-electrodes is isolated and insulated from the first electrode and the second electrode by an insulating layer, and
 wherein at least some of the unit-electrodes among the plurality of unit-electrodes have an auxiliary electrode formed in a linear shape with a line width less than the line width of at least one of the first electrode and the second electrode in the area.

2. The liquid crystal element according to claim 1, wherein the line width of the auxiliary electrode is ¾ or less of the line width of the first electrode and the line width of the second electrode.

3. The liquid crystal element according to claim 1, wherein the liquid crystal layer has a thickness of 5 μm or more and 30 μm or less.

4. The liquid crystal element according to claim 1, wherein the at least some of the unit-electrodes have a distance between the first electrode and the second electrode of 200 μm or less.

5. The liquid crystal element according to claim 1, wherein the auxiliary electrode is arranged along one electrode of the first electrode and the second electrode so as to be close to the one electrode, a distance between the auxiliary electrode and the one electrode is ½ or less of a distance between the auxiliary electrode and the other electrode.

6. The liquid crystal element according to claim 1, wherein the auxiliary electrode is arranged such that a distance P1 from the first electrode to the center of the auxiliary electrode is smaller than a distance P2 from the second electrode to the center of the auxiliary electrode,
when a voltage with an effective value V1E is applied to the first electrode and a voltage with an effective value V2E higher than the effective value V1E is applied to the second electrode, a voltage with an effective value V3E that satisfies the relationship of the following formula (1) is applied to the auxiliary electrode.

$$V3_E > (V2_E - V1_E) \times \frac{P1}{P1+P2} + V1_E \quad (1)$$

7. The liquid crystal element according to claim 1, wherein the at least some of the unit-electrodes include at least two unit-electrodes in which widths of the area are different from each other and positions of the auxiliary electrode in the area are different from each other.

8. The liquid crystal element according to claim 1, wherein a voltage equal to or higher than a threshold voltage of a liquid crystal material sealed in the liquid crystal layer is applied to the auxiliary electrode.

9. The liquid crystal element according to claim 1, wherein a voltage is applied to the auxiliary electrode that is equal to or higher than the voltage at which retardation starts to change when a vertical electric field is applied to a liquid crystal material sealed in the liquid crystal layer.

10. The liquid crystal element according to claim 1, wherein the auxiliary electrode includes a first auxiliary electrode and a second auxiliary electrode,
the first auxiliary electrode is arranged along the first electrode so as to be closer to the first electrode than the second electrode, and
the second auxiliary electrode is arranged along the second electrode so as to be closer to the second electrode than the first electrode.

11. The liquid crystal element according to claim 1, wherein a distance from the auxiliary electrode to the liquid crystal layer is equal to or less than a distance between at least one of the first electrode and the second electrode and the liquid crystal layer.

12. The liquid crystal element according to claim 1, wherein each of the plurality of unit-electrodes is configured to be able to generate a refractive index gradient in the liquid crystal layer in the area.

13. The liquid crystal element according to claim 1, wherein the plurality of unit-electrodes each has an arc shape or an annular shape and is arranged concentrically.

14. The liquid crystal element according to claim 1, wherein each of the plurality of unit-electrodes each has a rectangular shape and is arranged in series.

15. The liquid crystal element according to claim 1, wherein the liquid crystal element further includes a transmitted light limiting section that limits transmitted light at a boundary between two unit-electrodes arranged adjacently in a direction away from an optical axis to be less than transmitted light transmitted through the area.

16. The liquid crystal element according to claim 1, further comprising:
an insulating wall-like structure disposed at a boundary between two adjacent unit-electrodes.

17. Eyeglasses comprising the liquid crystal element according to claim 1.

18. The liquid crystal element according to claim 1, wherein the resistance layer in each of the plurality of unit-electrodes is overlapped with the first electrode and the second electrode when viewed in plan.

19. The liquid crystal element according to claim 1, wherein the auxiliary electrode is arranged opposite to the liquid crystal layer with respect to the resistance layer.

* * * * *